US007219951B2

(12) United States Patent  
Rasmussen

(10) Patent No.: US 7,219,951 B2
(45) Date of Patent: May 22, 2007

(54) TIE-DOWN ASSEMBLY

(75) Inventor: C. Martin Rasmussen, Fruit Heights, UT (US)

(73) Assignee: Lippert Components, Goshen, IN (US)

( * ) Notice: Subject to any disclaimer, the term of this patent is extended or adjusted under 35 U.S.C. 154(b) by 0 days.

(21) Appl. No.: 11/098,664

(22) Filed: Apr. 4, 2005

(65) Prior Publication Data

US 2005/0168011 A1   Aug. 4, 2005

(51) Int. Cl.
*B60P 1/00* (2006.01)

(52) U.S. Cl. ............ 296/156; 410/77; 410/80; 410/97; 410/100; 410/103

(58) Field of Classification Search ........... 410/77.8, 410/80, 97, 100, 103, 77; 296/156
See application file for complete search history.

(56) References Cited

U.S. PATENT DOCUMENTS

| 346,771 | A | 8/1886 | Phillips |
| 830,220 | A | 9/1906 | Gibson |
| 909,037 | A | 1/1909 | Taylor, Jr. et al. |
| 1,006,950 | A | 10/1911 | Keddy |
| 1,247,760 | A | 11/1917 | Wengraf |
| 1,374,963 | A | 4/1921 | Stevenson |
| 1,393,614 | A | 10/1921 | Ferragamo |
| 1,413,328 | A | 4/1922 | Ferragamo |
| 1,420,460 | A | 6/1922 | Sullivan |
| 1,636,638 | A | 7/1927 | Jenkins |
| 1,885,128 | A | 11/1932 | Montgomery |
| 1,904,102 | A | 4/1933 | Thompson |
| 1,972,346 | A | 9/1934 | Juline |
| 2,359,492 | A | 10/1944 | Rockwood et al. |
| 2,462,382 | A | 2/1949 | Gleason |
| 2,465,621 | A | 3/1949 | Wheeler |
| 2,500,488 | A | 3/1950 | Durbin et al. |
| 2,539,997 | A | 1/1951 | Graves |
| 2,564,821 | A | 8/1951 | Smith |
| 2,608,383 | A | 8/1952 | Edelblute |
| 2,628,397 | A | 2/1953 | Olson |
| 2,628,855 | A | 2/1953 | Cushman |
| 2,824,717 | A | 2/1958 | Yeager |
| 2,904,303 | A | 9/1959 | Gentiline |
| 3,368,785 | A | 2/1968 | Weiler |

(Continued)

FOREIGN PATENT DOCUMENTS

DE    7012032    3/1970

OTHER PUBLICATIONS

"Fastgun Lever Action Springloaded Turnbuckle . . . a revolutionary design," Torklift Central Welding of Kent, Jun. 2004, 2 pages.

(Continued)

*Primary Examiner*—Lori L. Lyjak
(74) *Attorney, Agent, or Firm*—Barnes & Thornburg, LLP

(57) ABSTRACT

A tie-down assembly may include a lever-type load binding mechanism and may be used to couple a truck to a truck camper. The tie-down assembly may include a cushioning member used to cushion a tension load applied between a first end and a second end of the tie-down assembly. The tie-down assembly may also include a removable handle that is used to operate the lever-type load binding mechanism.

75 Claims, 21 Drawing Sheets

U.S. PATENT DOCUMENTS

| | | | |
|---|---|---|---|
| 3,377,036 A | 4/1968 | McNatt et al. | |
| 3,402,961 A | 9/1968 | Larson | |
| 3,418,008 A | 12/1968 | Durbin | |
| 3,580,599 A | 5/1971 | Dodgen et al. | |
| 3,591,142 A | 7/1971 | Hatcher | |
| 3,601,864 A | 8/1971 | Roberts et al. | |
| 3,610,606 A | 10/1971 | Andrews | |
| 3,623,690 A | 11/1971 | Bargman, Jr. | |
| 3,638,895 A | 2/1972 | Henson | |
| 3,655,234 A | 4/1972 | Kirschbaum | |
| 3,706,469 A | 12/1972 | Covert | |
| 3,719,382 A | 3/1973 | Palm | |
| 3,751,083 A | 8/1973 | Jacobson et al. | |
| 3,781,057 A | 12/1973 | Manuel | |
| 3,782,774 A | 1/1974 | Sturek | |
| 3,792,900 A | 2/1974 | Bugh | |
| 3,814,460 A | 6/1974 | Norrish | |
| 3,837,701 A | 9/1974 | Curtis et al. | |
| 3,938,844 A | 2/1976 | Johnson, Jr. | |
| 3,954,252 A | 5/1976 | Lyons | |
| 3,974,544 A | 8/1976 | Roberts | |
| 3,988,005 A | 10/1976 | Mooney et al. | |
| 4,025,207 A | 5/1977 | Johnson, Jr. | |
| D245,312 S | 8/1977 | Rasmussen et al. | |
| 4,062,206 A | 12/1977 | McWhorter | |
| 4,090,691 A | 5/1978 | Bingaman | |
| 4,103,959 A | 8/1978 | Whiting et al. | |
| 4,131,264 A | 12/1978 | Patterson, III et al. | |
| 4,163,347 A | 8/1979 | Marcmann | |
| 4,198,174 A | 4/1980 | Borowiec et al. | |
| 4,211,389 A | 7/1980 | Frey et al. | |
| 4,223,869 A | 9/1980 | Patterson, III et al. | |
| 4,238,940 A | 12/1980 | McWhorter | |
| 4,257,570 A | 3/1981 | Rasmussen | |
| 4,280,432 A | 7/1981 | Dessel | |
| 4,335,489 A | 6/1982 | Muller et al. | |
| 4,358,232 A * | 11/1982 | Griffith | 410/100 |
| 4,401,333 A | 8/1983 | Merry | |
| 4,422,218 A | 12/1983 | Brasseux | |
| 4,423,639 A | 1/1984 | Grade et al. | |
| 4,500,073 A | 2/1985 | Smith | |
| 4,512,062 A | 4/1985 | Crook, Jr. | |
| 4,527,309 A * | 7/1985 | Kawahara | 410/103 |
| 4,567,627 A | 2/1986 | Patterson, III et al. | |
| 4,573,842 A | 3/1986 | Mantela et al. | |
| 4,706,343 A * | 11/1987 | Neidigk | 410/100 |
| 4,756,181 A | 7/1988 | Appelgren | |
| 4,778,194 A | 10/1988 | Koch et al. | |
| 4,800,627 A | 1/1989 | Smith | |
| 4,936,239 A | 6/1990 | Awalt, Jr. | |
| D309,854 S | 8/1990 | Smith | |
| 4,977,646 A | 12/1990 | McCraw | |
| D313,338 S | 1/1991 | Rasmussen | |
| 5,002,002 A | 3/1991 | Awalt, Jr. | |
| 5,020,839 A | 6/1991 | Kalb | |
| 5,429,462 A * | 7/1995 | Anderson | 410/100 |
| 5,429,463 A | 7/1995 | Howell | |
| 5,538,376 A * | 7/1996 | Borda | 410/99 |
| 5,702,196 A | 12/1997 | Petercsak | |
| 5,704,668 A | 1/1998 | Ferrato | |
| 5,765,957 A | 6/1998 | Connell | |
| 5,775,673 A | 7/1998 | Carnes, Sr. et al. | |
| 5,833,302 A | 11/1998 | Kerr | |
| 5,908,274 A * | 6/1999 | Silberman | 410/10 |
| 6,048,146 A * | 4/2000 | Wiedmeyer | 410/100 |
| 6,050,737 A | 4/2000 | Russell | |
| 6,056,069 A | 5/2000 | Hagen et al. | |
| 6,065,914 A * | 5/2000 | Fotou | 410/100 |
| 6,106,052 A | 8/2000 | Shaw | |
| 6,141,836 A | 11/2000 | Thornton | |
| 6,145,920 A | 11/2000 | Rasmussen | |
| 6,374,465 B1 | 4/2002 | Dykstra | |
| 6,477,747 B1 | 11/2002 | Flagg | |
| 6,547,314 B1 | 4/2003 | Rasmussen | |
| 6,666,633 B2 * | 12/2003 | Hsieh | 410/85 |
| 2005/0191118 A1 | 9/2005 | Kay | |
| 2005/0254886 A1 * | 11/2005 | Kay | 403/43 |
| 2005/0263301 A1 | 12/2005 | Kay | |

OTHER PUBLICATIONS

"Johnson Architectural Hardware—America's #1 Manufacturer of Stainless Steel Cable Fittings," C. Sherman Johnson Co., Inc., 2004, pp. 1-21.

"Johnson Architectural Hardware—America's #1 Manufacturer of Stainless Steel Cable Fittings," C. Sherman Johnson Co., Inc., 2005 Catalog, pp. 1-26.

"Johnson Marine Hardware—Innovative in 1958 Innovative Today . . . ," C. Sherman Johnson Co., Inc., 2005, pp. 1-46.

"Johnson Marine Hardware," C. Sherman Johnson Co., Inc., 2004 Catalog, pp. 1-35.

"Lashing Equipment," H-Lift Industries Co., Ltd., Hangzhou, China, www.h-lift.com, Copyright 2003, 3 pages.

"Make Sure It's Secure," CMworks.com, A Columbus McKinnon Company, CMLBB-1, Mar. 2002, 16 pages.

"Northern Industrial Tools Heavy Duty Load Binder," Northern Tool + Equipment, NorthernTool.com, 1 page.

"Northern Industrial Tools Light Duty Load Binder," Northern Tool + Equipment, NorthernTool.com, 1 page.

"Products," Ningbo Baoli Imp & Exp Co., Ltd., http://www.chinalifting.com, Copyright 2003, 2 pages.

"Table of Contents and CM Entertainment Rigging Products," Table of Contents page and attached pp. 4-59.

"Torklift—Custom Truck Camper Packages," Torklift Central Welding of Kent, Dec. 2004, 2 pages.

"Torklift—Wanted: The Fastest GUN In The West," Torklift Central Welding of Kent, web page available on Jun. 20, 2004, 4 pages.

"Torklift Fast Gun Turnbuckles," rv.net, first post dated Apr. 21, 2004, 7 pages.

* cited by examiner

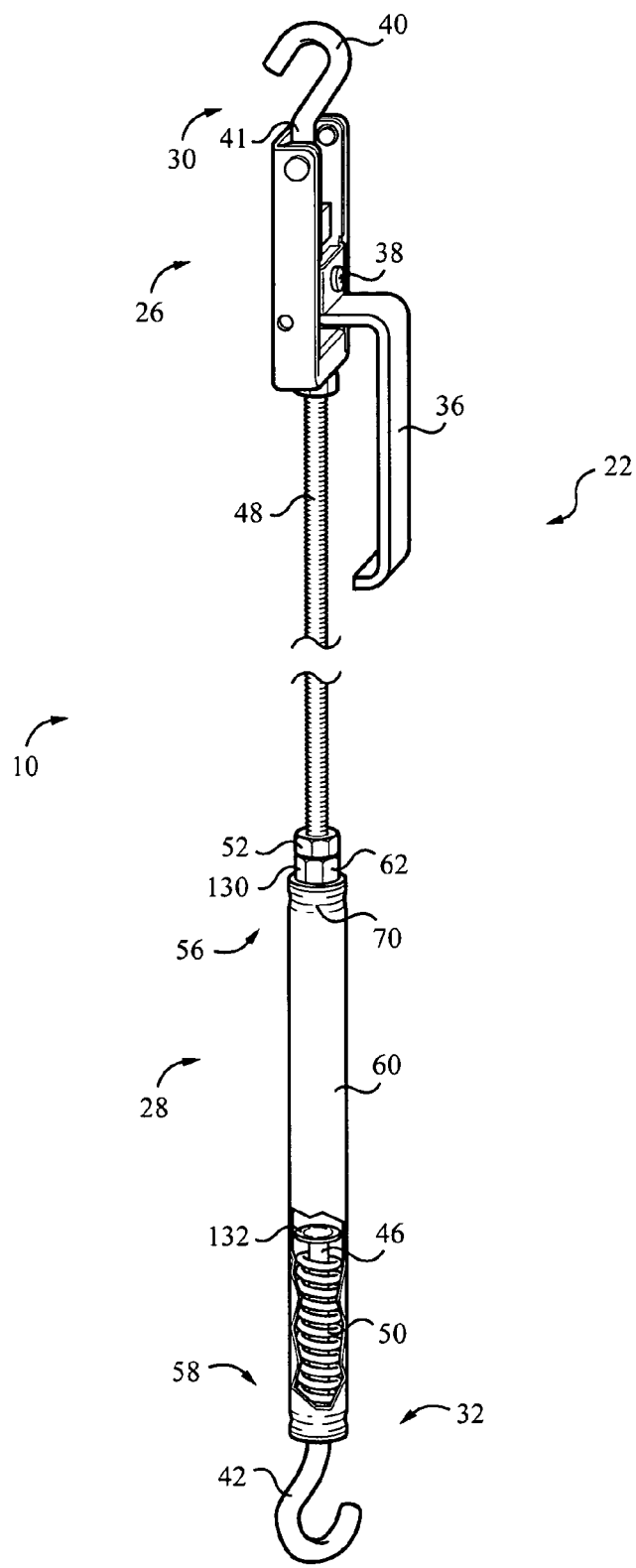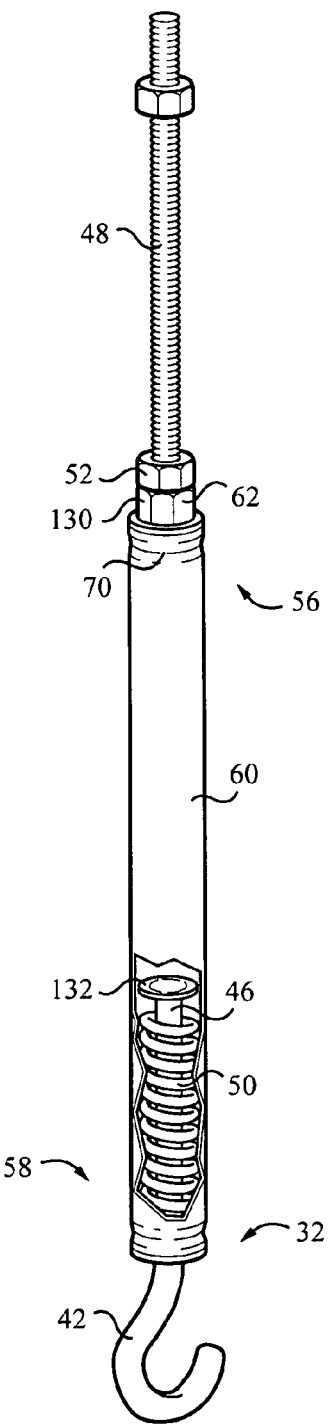
FIG. 21
FIG. 22

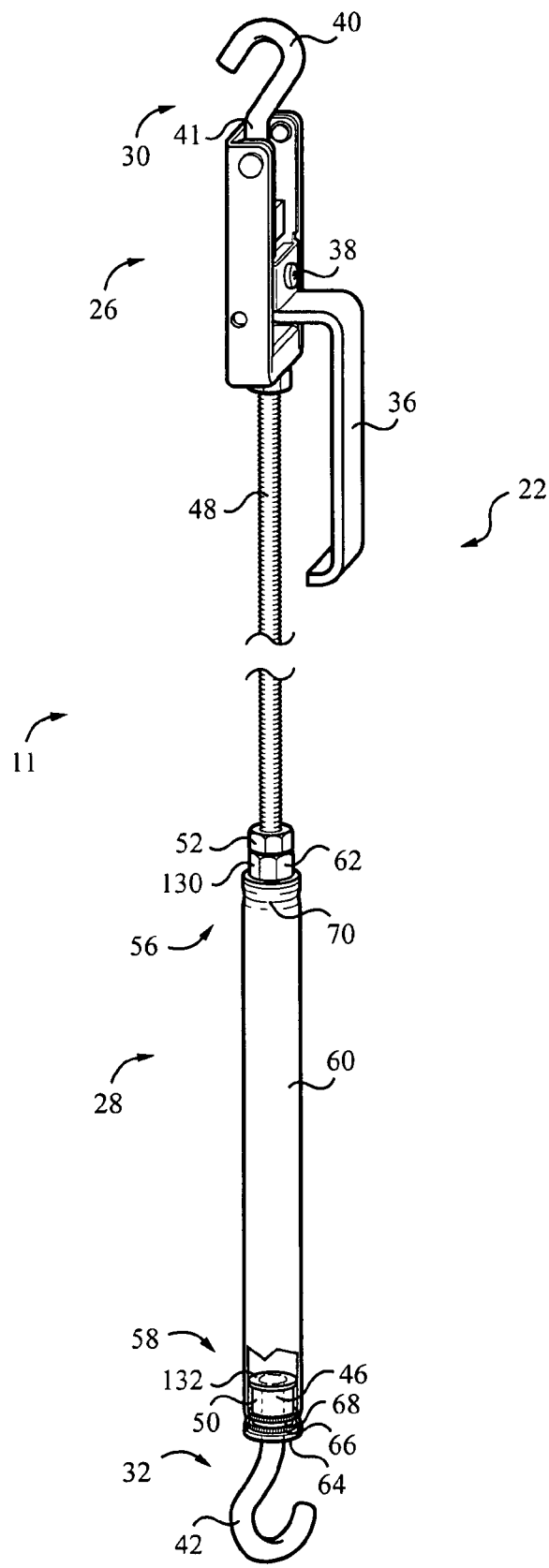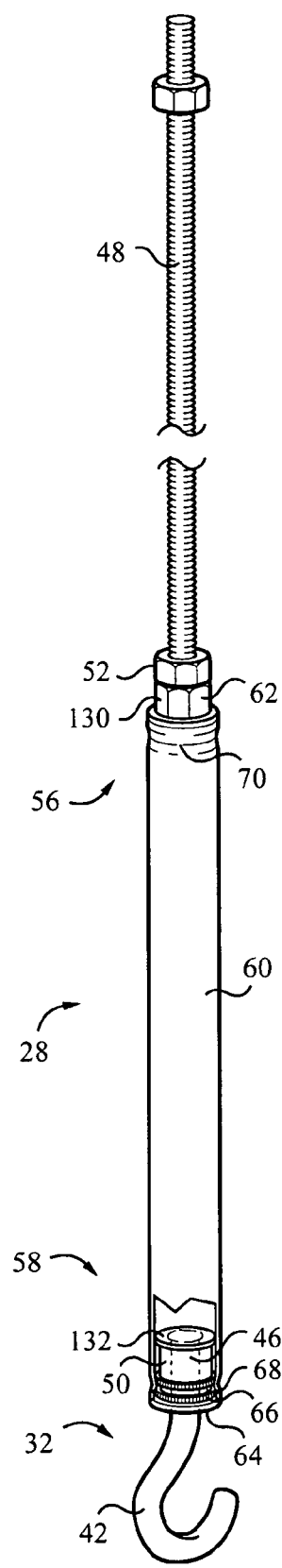
FIG. 25
FIG. 26

TIE-DOWN ASSEMBLY

BACKGROUND

Truck campers are a type of recreational vehicle that are typically received in and supported by the bed of a pickup truck. Users can use the truck camper as overnight sleeping quarters on a temporary or full time basis. Many truck campers include a cab over portion that has a bed. The truck can be used to transport the truck camper to a wide variety of locations. When the user reaches a location and wants to use the truck without the truck camper, the user can support the truck camper with electric jacks or any other suitable lifting or supporting device and drive the truck separately. The truck and truck camper combination provide a highly versatile and functional unit for transporting and lodging users. In those instances where the truck is a 4×4, the truck and truck camper can often travel to locations that may otherwise be inaccessible to other types of recreational vehicles such as jeep trails and backcountry camping areas. Even when the truck is not a 4×4, it is often shorter in length than comparable towable recreational vehicles so it allows the truck and truck camper to be taken to locations that other longer recreational vehicles cannot be taken.

Because truck campers are supported, at least in part, by the truck rather than having its own wheels like fifth wheels or travel trailers, it is necessary to find a suitable method and location to secure the truck camper to the truck. The truck camper may be coupled to a number of suitable locations on the truck. For example, the truck camper may be coupled to the bed and/or frame of the truck adjacent to the front and/or rear of the bed of the truck. Suitable locations for coupling the truck camper to the truck include the frame, bumper, and/or bed of the truck.

One common way to couple the truck camper to the truck is with the use of a turnbuckle. Unfortunately, turnbuckles can have some disadvantages. For example, tightening and loosening a turnbuckle often requires repetitive and sometimes difficult hand movements. This problem may be compounded in some instances where it is difficult to grip the turnbuckle. Users having a medical condition such as arthritis may find it particularly difficult to grip and turn the turnbuckles. Repeatedly tightening and loosening turnbuckles can also be time consuming.

In an attempt to improve on the turnbuckle, a tie-down was developed that used a lever-type load binding mechanism to allow the tie-down to be more readily coupled between the truck and the truck camper. This tie-down, however, suffers from a number of disadvantages. One disadvantage is that because the tie-down was more readily removed than a turnbuckle, it was much easier for others to steal or loosen the tie-down without the user of the truck knowing. If the user operated the truck with a loose or missing tie-down a dangerous situation may ensue. Another disadvantage is that the length of the previous tie-down was unable to be adjusted while the tie-down is coupled between the truck and the truck camper. Instead, users were required to completely uncouple one end of the tie-down in order to adjust the length of the tie-down. Once the length had been adjusted, the user would then have to couple the tie-down back to the truck and truck camper, tension the load binding mechanism, and see if the tie-down was the correct length to provide the desired tension. If the desired tension was not provided, then the user would have to release the load binding mechanism, uncouple at least one end of the tie-down and adjust the length. This process had to be repeated until the desired tension was achieved. Coupling and decoupling the tie-down to the truck or truck camper and adjusting the length can be tedious.

It should be appreciated that the subject matter in the claims should not be regarded as being limited either literally or under the doctrine of equivalents to including or excluding components, features, or structure or being otherwise configured to overcome the disadvantages or shortcomings of previous tie-downs, unless such components features, structure, or configuration is explicitly recited in the claims in structural and/or functional terms.

DRAWINGS

FIG. 21 shows a cut-away perspective view of one embodiment of the front tie-down assembly from FIG. 16.

FIG. 22 shows a cut-away perspective view of a turnbuckle portion of the front tie-down assembly from FIG. 16.

FIG. 25 shows a cut-away perspective view of one embodiment of the rear tie-down assembly from FIG. 16.

FIG. 26 shows a cut-away perspective view of a turnbuckle portion of the rear tie-down assembly from FIG. 16.

DESCRIPTION

Although the tie-down assemblies described herein are shown in the context of coupling a truck camper to a truck, it should be understood that the tie-down assemblies may be used to couple any of a number of suitable objects together and/or otherwise be used to tie down a wide variety of loads. Thus, the concepts and features of the tie-down assemblies described herein may be used in a variety of settings and situations as would be recognized by those of ordinary skill in the art. Also, it should be understood, that the features, advantages, characteristics, etc. of one embodiment of a tie-down assembly may be applied to or used in any other embodiment to form an additional embodiment unless noted otherwise.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Figure 1:
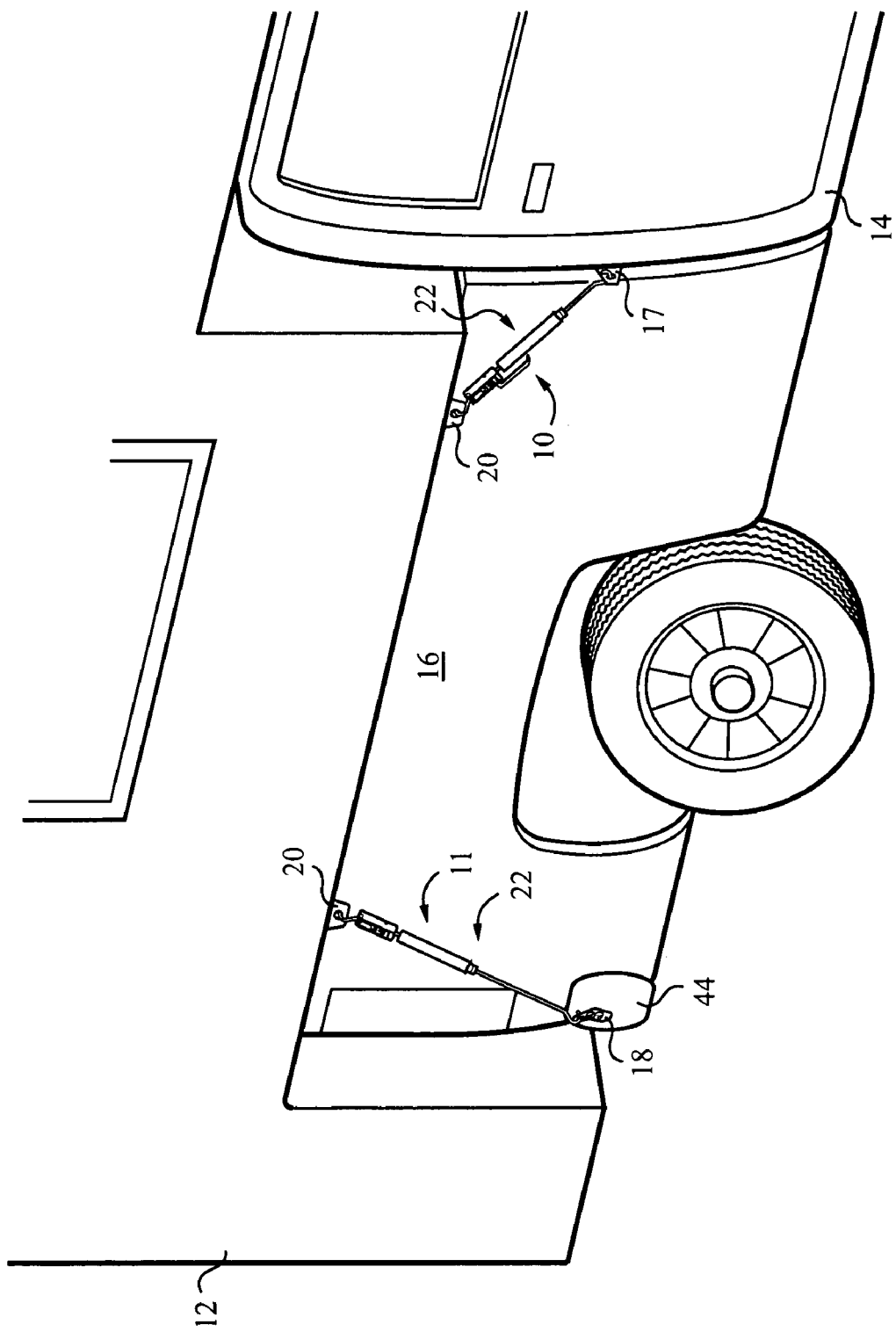
FIG. 1 shows a perspective side view of one embodiment of a tie-down assembly used to couple a truck camper to a truck.

Referring to FIG. 1 a front tie-down assembly 10 and a rear tie-down assembly 11 are shown being used to couple a truck camper 12 to a truck 14—alternatively referred to herein as pickup truck or vehicle. Although only the passenger's side of the truck 14 is shown, it should be understood that two additional tie-down assemblies 10, 11 may be used to couple the truck camper 12 to the truck 14 on the driver's side of the truck 14. Thus, in this embodiment, four tie-down assemblies 10, 11 are used to couple the truck camper 12 to the truck 14. It should be appreciated, however, that more or less than four tie-down assemblies 10, 11 may be used. Also, it should be appreciated that although the front tie-down assembly 10 and the rear tie-down assembly 11 are configured differently, the truck camper 12 and the truck 14 may be coupled together using four of the front tie-down assemblies 10, four of the rear tie-down assemblies 11, or any number and combination of front tie-down assemblies 10 and rear tie-down assemblies 11. For example, each tie-down assembly 10, 11 may be custom made so that each is uniquely configured.

The truck camper 12 is supported by a truck bed 16 of the truck 14. In this embodiment, the truck 14 has a typical bed 16 that has side walls and is open on the top and includes a removable tail gate (not shown). When the truck camper 12 is positioned in the bed 16, the tail gate is normally, but not always, removed from the bed 16. Whether the tail gate is removed depends largely on the size and configuration of the truck camper 12. Larger truck campers 12 are often sized to fit in the bed 16 with the tail gate removed while smaller truck campers 12 can be sized to fit in the bed 16 with the tail gate in place. It should be appreciated that other trucks may also be used such as flat bed trucks, custom made trucks, etc. In situations where the truck camper 12 is relatively large, the truck 14 may be the type that is commonly referred to as a full size pickup truck. In other embodiments, the truck 14 may be a compact pickup truck or any other sized truck.

The truck camper 12 may be configured in a variety of different ways. For example, the truck camper 12 may include a slide-out compartment, pop-up top, toilet, cab-over bed, refrigerator, stove, sink, microwave, dinette, television, back-up camera, shower, etc. The more of these features that the truck camper 12 has the larger it tends to be. The truck camper 12 may be used as mobile living quarters for one or more users.

It is desirable to securely couple the truck camper 12 to the truck 14 to prevent the truck camper 12 from sliding and/or coming out of the truck 14 during travel. Preventing movement of the truck camper 12 relative to the truck 14 also makes the truck 14 easier to handle during operation.

The typical truck 14 does not come from the manufacturer with suitable anchor points to couple the truck camper 12 to the truck 14. Therefore, in many instances, front anchor assemblies 17 and rear anchor assemblies 18—both of which may be alternatively referred to herein as mounting members, anchor members, or mounting structure—are used on each side of the truck 14 to provide suitable locations for the truck camper 12 to be coupled to the truck 14. In the embodiment shown in FIGS. 1–5, the front anchor assemblies 17 each include a plate or bracket coupled between the bed 16 and the cab of the truck 14. The bracket may have an opening 19 which is used to couple the front tie-down assembly 10 to the front anchor assembly 17. The rear anchor assemblies 18 are coupled to the bumper 44 of the truck 14. The anchor assemblies 17, 18, shown in FIGS. 1–5, may be similar in many respects to that shown in U.S. Pat. No. 6,547,314, which is incorporated herein by reference in its entirety.

It should be appreciated that any suitable anchor assemblies 17, 18 may be used to provide a suitable location to couple the truck camper 12 to the truck 14. For example, the various anchor assemblies shown in U.S. Pat. Nos. 6,145,920, 4,257,570, D313338, D245312, U.S. Pat. No. 6,688,672 or U.S. Pat. No. 6,260,910, all of which are expressly incorporated herein by reference in their entireties as though the complete contents were reproduced herein, may be used to couple the truck camper 12 to the truck 14. The tie-down assemblies 10, 11 described herein may be used with any of these anchor assemblies.

The truck camper 12 includes anchor assemblies 20—alternatively referred to herein as mounting structure, anchors, mounting brackets, or mounting members—which are used to couple the truck camper 12 to the truck 14. As shown in FIGS. 1–5, the anchor assemblies 20 each include an opening 21 which can be used to couple the tie-down assemblies 10, 11 to the anchor assemblies 20. Although the anchor assemblies 20 are shown as being the same, it should be appreciated that they may also be different depending on the design and configuration of the truck camper 12.

Figure 2:
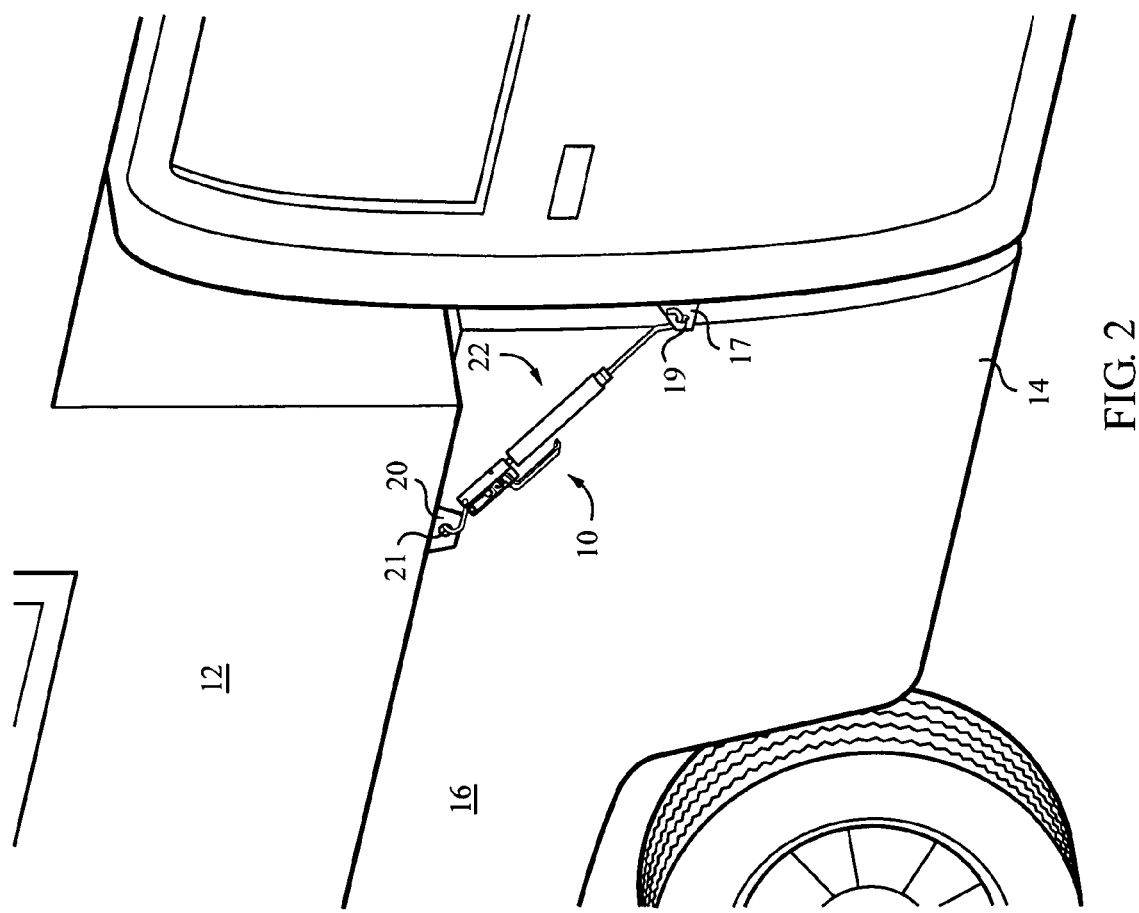
FIG. 2 shows a perspective view of the front tie-down assembly from FIG. 1 in a tensioned positioned.
Figure 3:
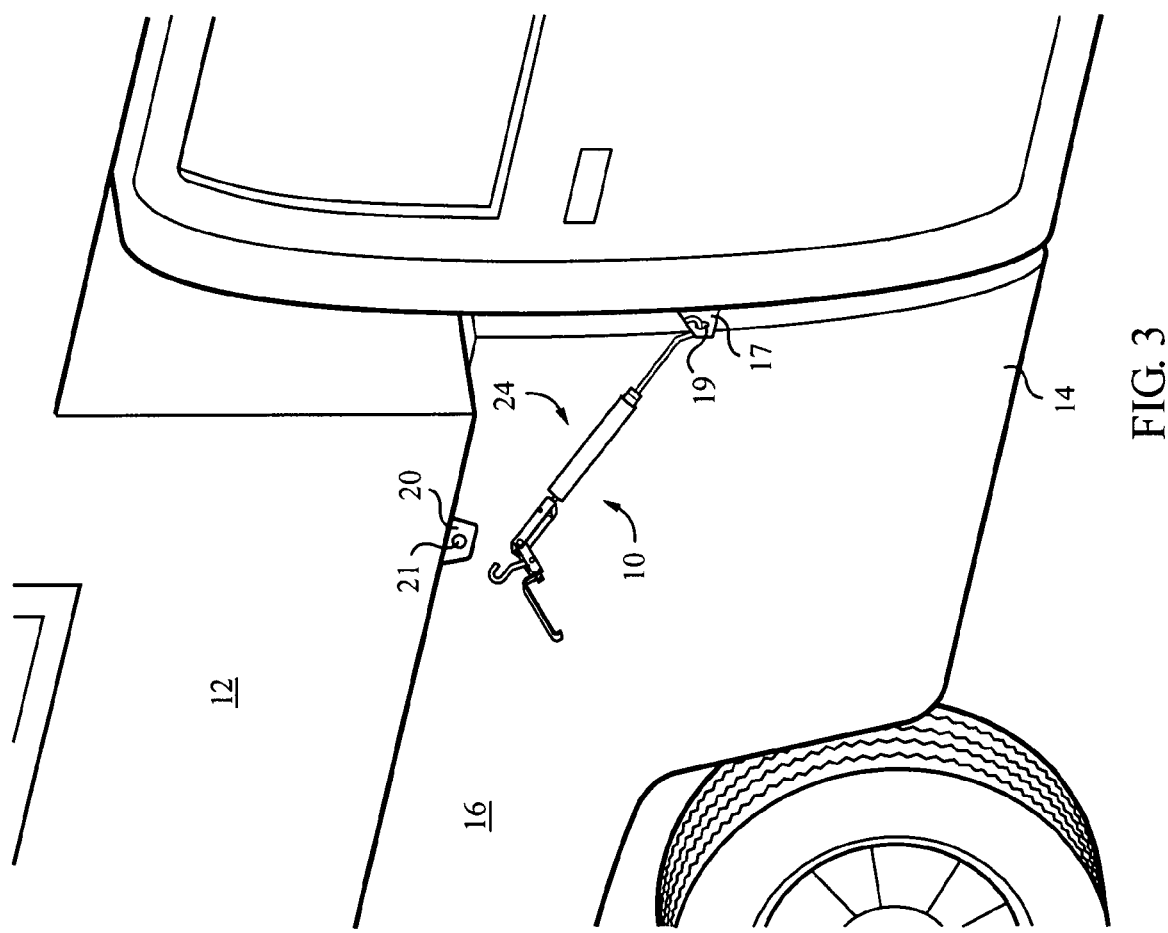
FIG. 3 shows a perspective view of the front tie-down assembly from FIG. 1 in a released position.

In FIG. 2, the front tie-down assembly 10 used to hold the front of the truck camper 12 to the front of the bed 16 of the truck 14 is shown in a tensioned position 22. In FIG. 3, the front tie-down assembly 10 is shown in a released position 24. In the tensioned position 22, the front tie-down assembly 10 is used to provide a tension load between the anchor assembly 20 on the truck camper 12 and the front anchor assembly 17 on the truck 14. The tension load is sufficient to securely couple the truck camper 12 to the truck 14. In the released position 24, the front tie-down assembly 10 can be easily coupled to and/or decoupled from the truck camper 12 and the truck 14, as shown in FIG. 3.

Figure 4:
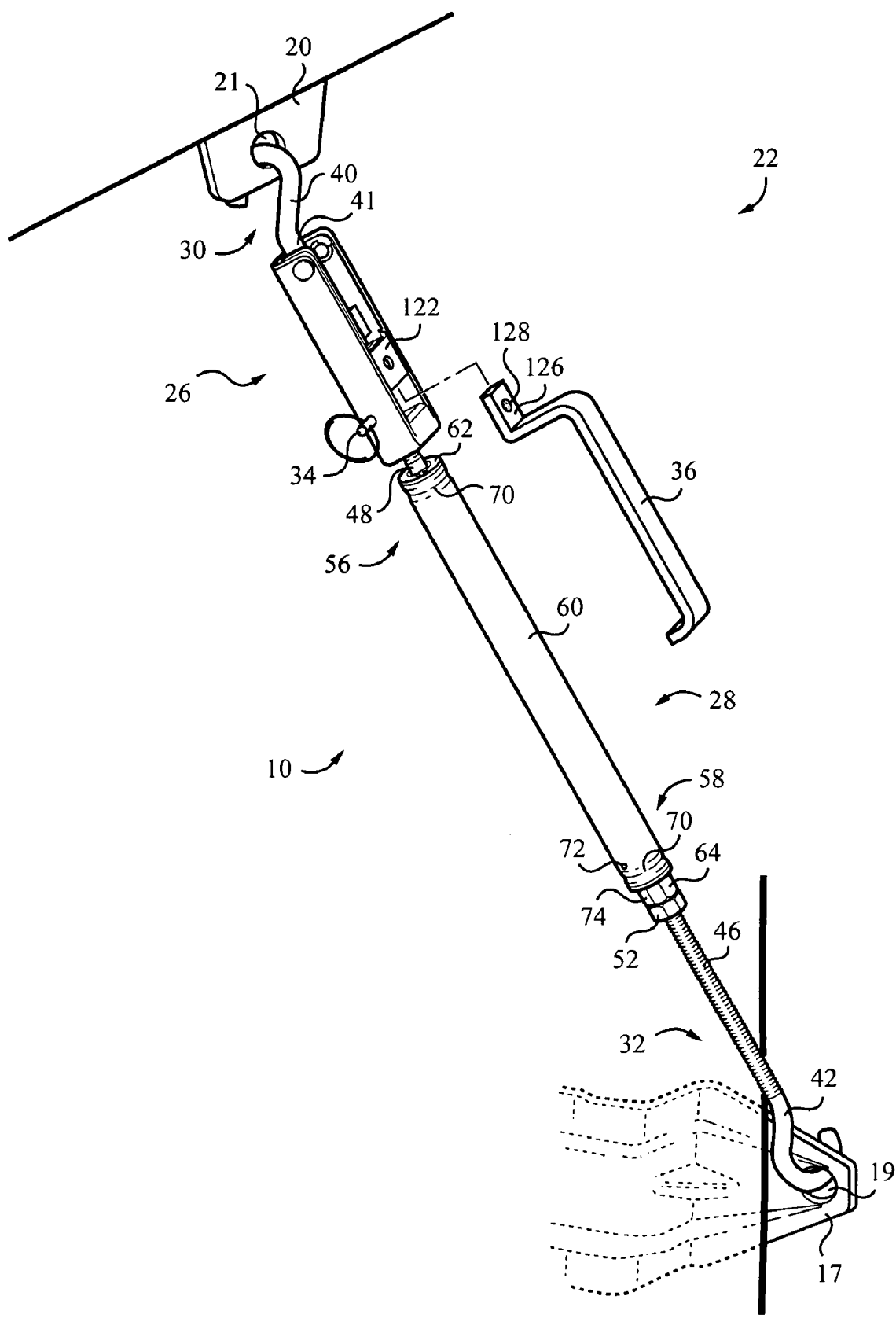
FIG. 4 shows a perspective view of the front tie-down assembly from FIG. 1 in a tensioned position and having a removable handle.
Figure 5:
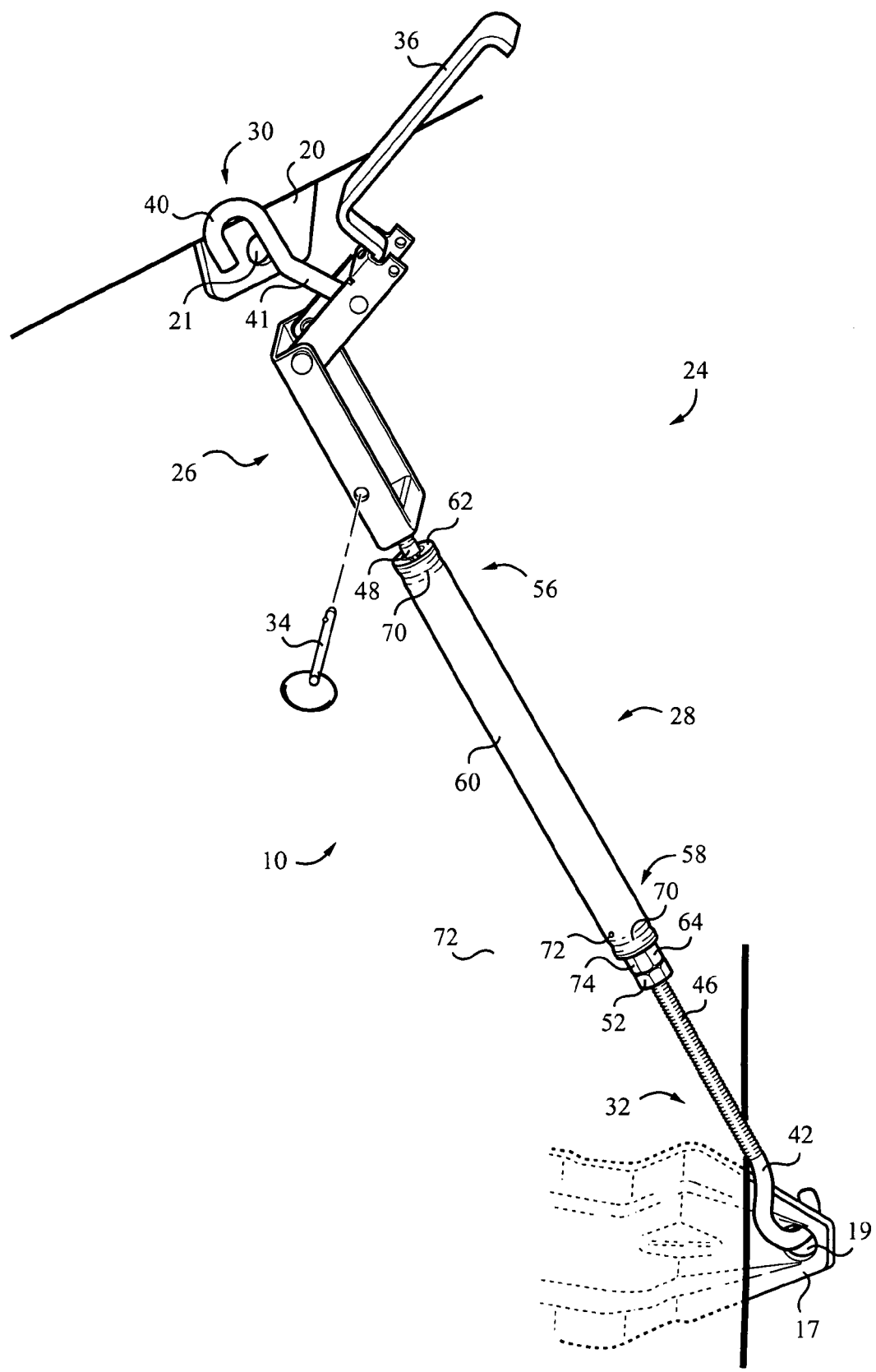
FIG. 5 shows a perspective view of the front tie-down assembly from FIG. 1 in a released position.
Figure 6:
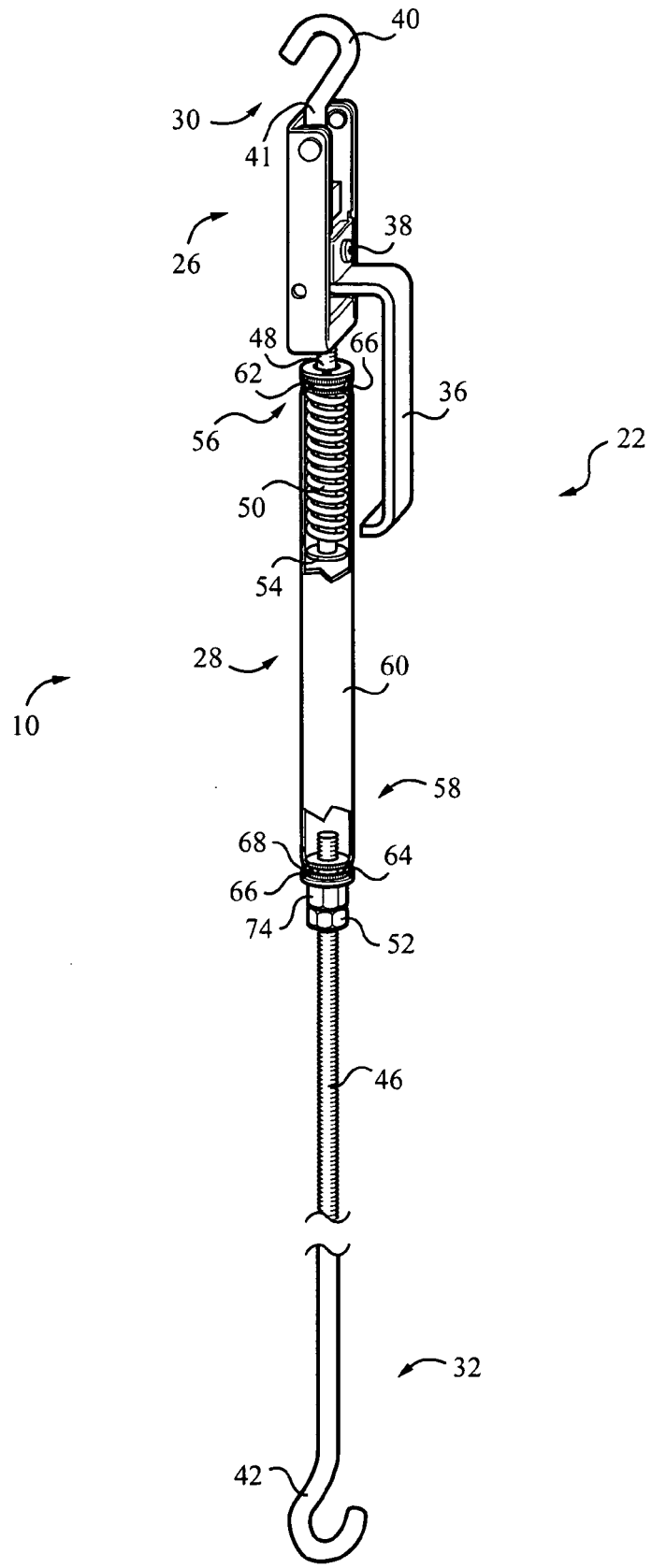
FIG. 6 shows a cut-away perspective view of one embodiment of the front tie-down assembly from FIG. 1.

Referring to FIGS. 4–6, the front tie-down assembly 10 includes a lever-type load binding mechanism 26—alternatively referred to herein as lever-type quick release mechanism, load binding mechanism, or quick release mechanism—and a turnbuckle portion 28. The front tie-down assembly 10 also has a first end 30 and a second end 32. The load binding mechanism 26, when coupled between the front anchor assembly 17 and the anchor assembly 20, is capable of being moved between the tensioned position 22 where a tension load is applied between the first end 30 and the second end 32 and the released position 24 where a tension load is not applied between the first end 30 and the second end 32.

The load binding mechanism 26 is configured to receive a securing member 34 which is used to hold the load binding mechanism 26 in the tensioned position 22. The securing member 34 can be used to prevent the front tie-down assembly 10 from being inadvertently moved to the released position 24 and/or prevent the front tie-down assembly 10 from being stolen or otherwise tampered with. In FIGS. 4–5, a pin is shown as being used as the securing member 34. However, it should be appreciated that any of a number of suitable securing or locking members could be used such as a lock (e.g., combination lock, pin lock, key lock, etc.), wire, and so on. It should be appreciated that the load binding mechanism 26 may also be configured so that it is not capable of being locked in the tensioned position 22.

The load binding mechanism 26 includes a handle or lever 36 which is used to operate the load binding mechanism 26. As shown in FIGS. 4–6, the handle 36 is used to move the load binding mechanism 26 between the tensioned position 22 and the released position 24. The handle 36 may also be removed from the load binding mechanism 26 to prevent others from operating or tampering with the load binding mechanism 26. This may be particularly useful when the load binding mechanism 26 is in the tensioned position 22. In addition to preventing others from operating the load binding mechanism 26, the use of the removable handle 36 allows a single handle 36 to be used to operate all of the tie-down assemblies 10, 11.

As shown in FIGS. 4–6, the handle 36 may be removably coupled to the load binding mechanism 26 using a fastener 38 such as a bolt or screw. As explained in connection with FIGS. 11–15, the handle 36 does not need to be coupled to the load binding mechanism 26 using the fastener 38 in order to use the handle 36 to move the load binding mechanism 26 between the tensioned position 22 and the released position 24.

It should be appreciated that referring to the handle 36 as being removable means that the handle 36 is designed in a way that allows it to be taken off and put back on again. This is in contrast to configurations where the handle 36 would be commonly understood as being unremovable (welded, single contiguous piece of material, etc.). It should also be appreciated that although a removable handle is shown in FIGS. 4–6 an unremovable handle 36 may also be used with the tie-down assemblies 10, 11.

The first end 30 of the front tie-down assembly 10 includes a first hook 40 and the second end 32 includes a second hook 42. The first hook 40 includes a linear portion 41 that extends from the load binding mechanism 26. The first hook 40 may be considered part of the load binding mechanism 26. In other embodiments, the first hook 40 may be configured to be a separate component from the load binding mechanism 26. The first hook 40 is received by the anchor assembly 20 on the truck camper 12 and provides a secure and simple way to couple the front tie-down assembly 10 to the truck camper 12. It should be appreciated that the first hook 40 may also be used to couple the front tie-down assembly 10 to the truck 14.

The second hook 42 includes a linear portion 46 which is threadably received by the turnbuckle portion 28 of the front tie-down assembly 10. In one embodiment, the second hook 42 may be a threaded J-hook. However, it should be understood that any suitable structure may be used to provide the second end 32 which is used to couple the front tie-down assembly 10 to the front anchor assembly 17 (e.g., clevis and pin arrangement, etc.). The use of a threaded linear portion 46 allows the turnbuckle portion 28 to be rotated relative to the second hook 42 so that the length of the front tie-down assembly 10 may be adjusted without rotating the load binding mechanism 26. Once the length of the front tie-down assembly 10 has been adjusted, a nut 52 on the linear portion 46 of the second hook 42 may be tightened against the turnbuckle portion 28 to prevent the second hook 42 from moving relative to the turnbuckle portion 28.

As shown in FIGS. 4–6, a rod 48—alternatively referred to herein as a rod member or intermediate member—may be used to couple the load binding mechanism 26 to the turnbuckle portion 28. In this embodiment, the rod 48 is threadably received and secured to the load binding mechanism 26 and is configured to rotate freely relative to the turnbuckle portion 28. Because the rod 48 can rotate freely relative to the turnbuckle portion 28, the length of the front tie-down assembly 10 may be adjusted without rotating or moving the load binding mechanism 26. This allows the user to adjust the distance between the first end 30 and the second end 32 of the front tie-down assembly 10 while the first hook 40 and the second hook 42 remain engaged with the anchor assemblies 20, 17, respectively. It should be appreciated that although the rod 48 is shown being threadably received by the load binding mechanism 26 and freely rotatable relative to the turnbuckle portion 28, the rod 48 may be configured to be freely rotatable relative to the load binding mechanism 26 and threadably received by the turnbuckle portion 28 or may be configured to be freely rotatable relative to both the load binding mechanism 26 and the turnbuckle portion 28.

Referring to FIG. 6, the front tie-down assembly 10 may also include a cushioning member 50 which is used to cushion the tension load applied by the front tie-down assembly 10 between the truck camper 12 and the truck 14. The use of the cushioning member 50 allows the front tie-down assembly 10 to absorb some of the shocks that occur when the truck 14 transports the truck camper 12.

In the embodiment shown in FIG. 6, the cushioning member 50 is a spring. However, it should be appreciated that any suitable cushioning member 50 may be used to cushion the tension load such as a gas charged cylinder. The rod 48 has a retaining member or washer 54 coupled to the end of the rod 48 positioned in the turnbuckle portion 28. The cushioning member 50 is positioned between the retaining member 54 and an upper end or first end 56 of the turnbuckle portion 28 so that when a tension load is applied between the first end 30 and the second end 32 of the front tie-down assembly 10, the cushioning member 50 is compressed between the upper end 56 of the turnbuckle portion 28 and the retaining member 54 coupled to the rod 48. It should be appreciated that the cushioning member 50 may be positioned in any of a number of other suitable locations. For example, in one embodiment, the cushioning member 50 may be positioned between the rod 48 and the load binding mechanism 26. In another embodiment, the cushioning member 50 may be coupled between the curved end of the first hook 40 and/or the second hook 42 and anchor assemblies 20, 17, respectively. Any suitable configuration may be used.

In addition to the upper end 56, the turnbuckle portion 28 has a lower end or second end 58. The turnbuckle portion 28 includes a turnbuckle body 60, an upper end plug 62 and a lower end plug 64. The turnbuckle body 60 may be made using a generally cylindrical or tubular material (e.g., steel) that is sized to receive end plugs 62, 64 therein. The end plugs 62, 64 include two rows of teeth 66 separated by a channel 68. The end plugs 62, 64 may be coupled to the turnbuckle body 60 by positioning the end plugs 62, 64 inside the turnbuckle body 60. The turnbuckle body 60 may be crimped in the area surrounding the channel 68 of each end plug 62, 64 so that the crimped portion 70 in combination with the teeth 66 on the end plugs 62, 64 act to securely hold the turnbuckle body 60 and the end plugs 62, 64 together.

The lower end plug 64 may be provided with a hexagonal shaped portion 74 which can receive a conventional open end wrench. When the wrench is engaged with the hexagonal shaped portion 74, the user can prevent the turnbuckle portion 28 from rotating while the nut 52 is tightened against the lower end plug 64. It should be appreciated that although the portion 74 of the lower end plug 64 is shown as being hexagonal, the portion 74 may be any other suitable shape such as square, octagonal, etc.

The corrosion resistance of the front tie-down assembly 10 may be increased in a number of ways. For example, a hole 72 may be provided in the lower end 58 of the turnbuckle body 60 to allow water or moisture that enters the interior of the turnbuckle body 60 to drain. Also, the entire turnbuckle portion 28 and/or the entire front tie-down assembly 10 may be chromed. It should be appreciated that the same corrosion resistance measures may be used with the rear tie-down assembly 11.

Figure 7:
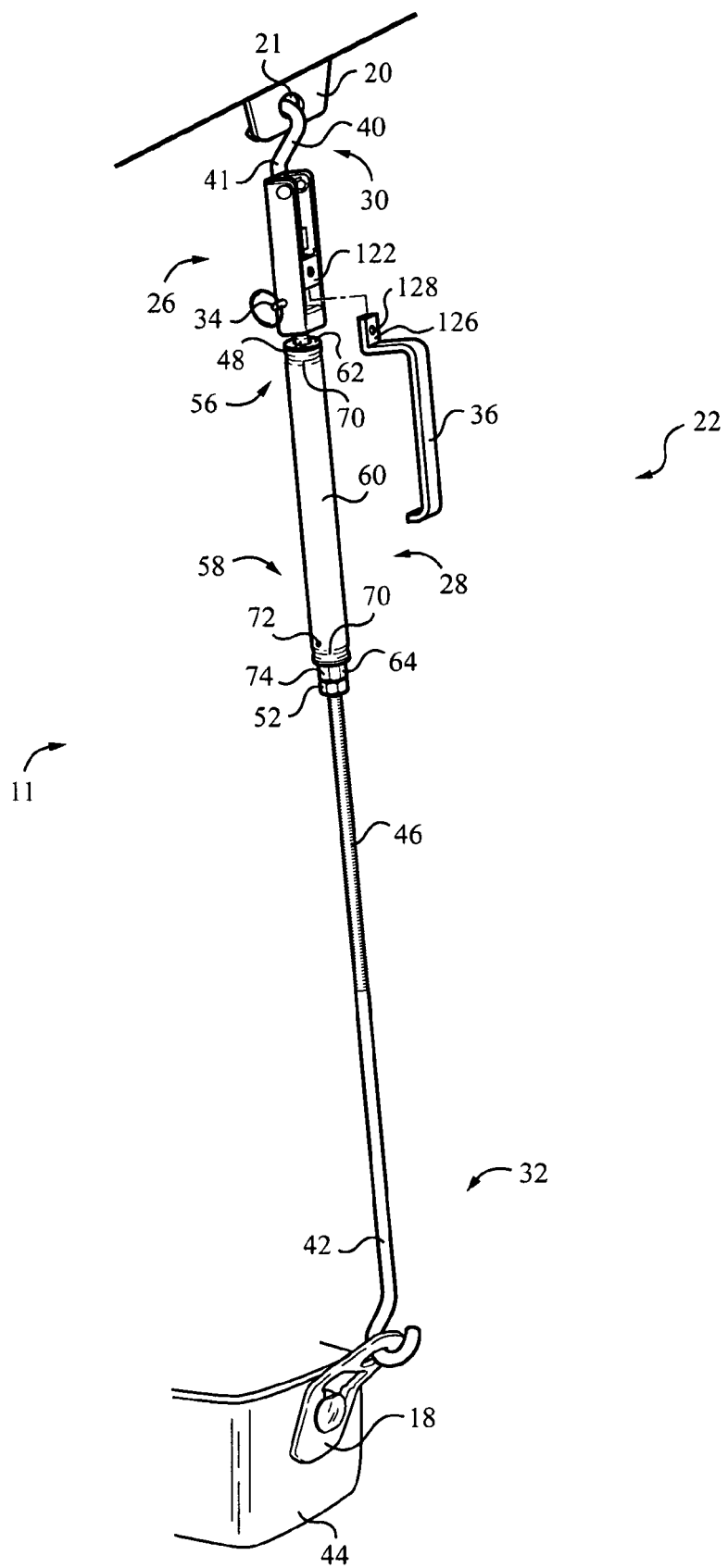
FIG. 7 shows a perspective view of the rear tie-down assembly from FIG. 1 in a tensioned position and having a removable handle.
Figure 8:
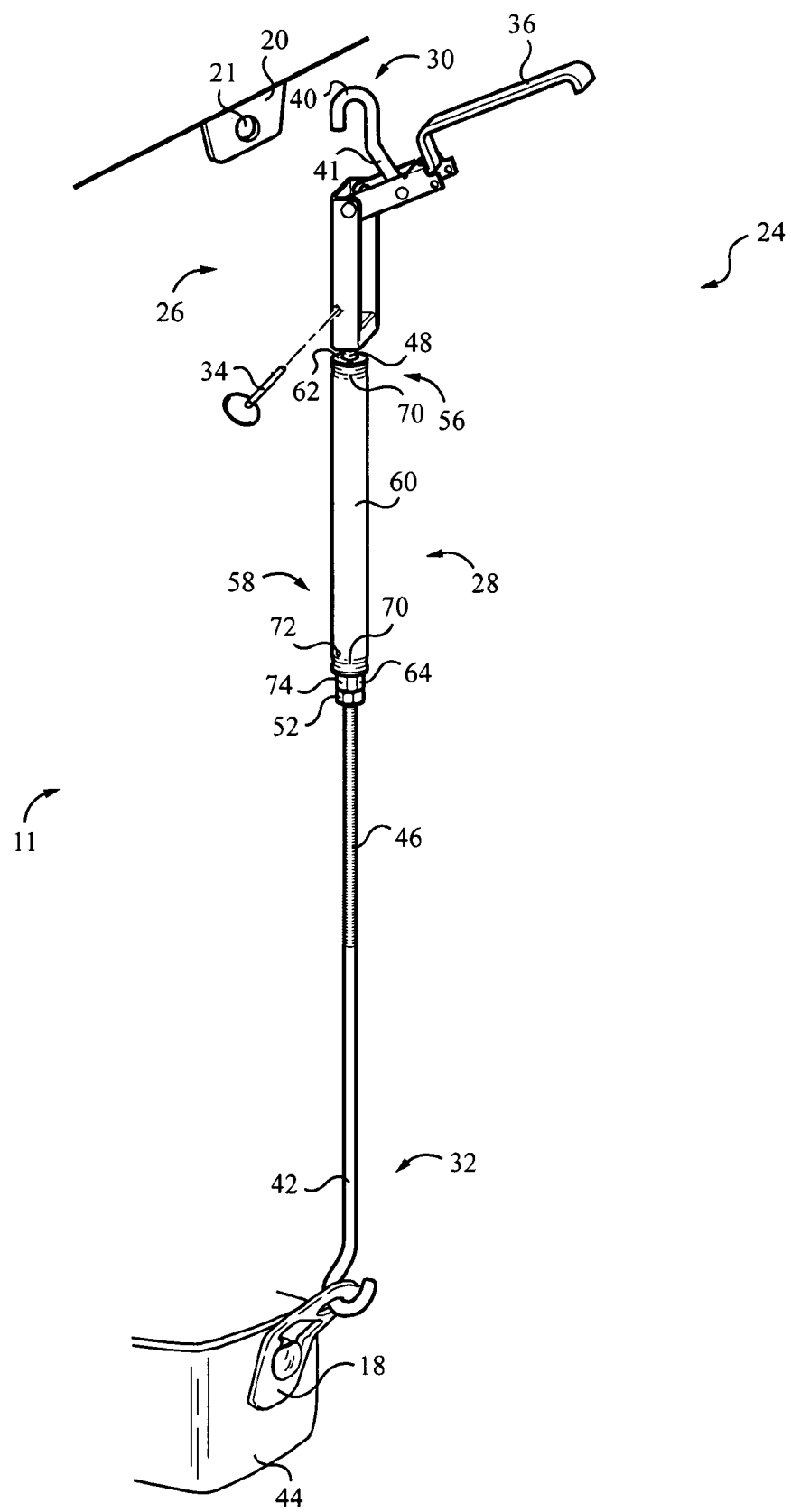
FIG. 8 shows a perspective view of the rear tie-down assembly from FIG. 1 in a released position.
Figure 9:
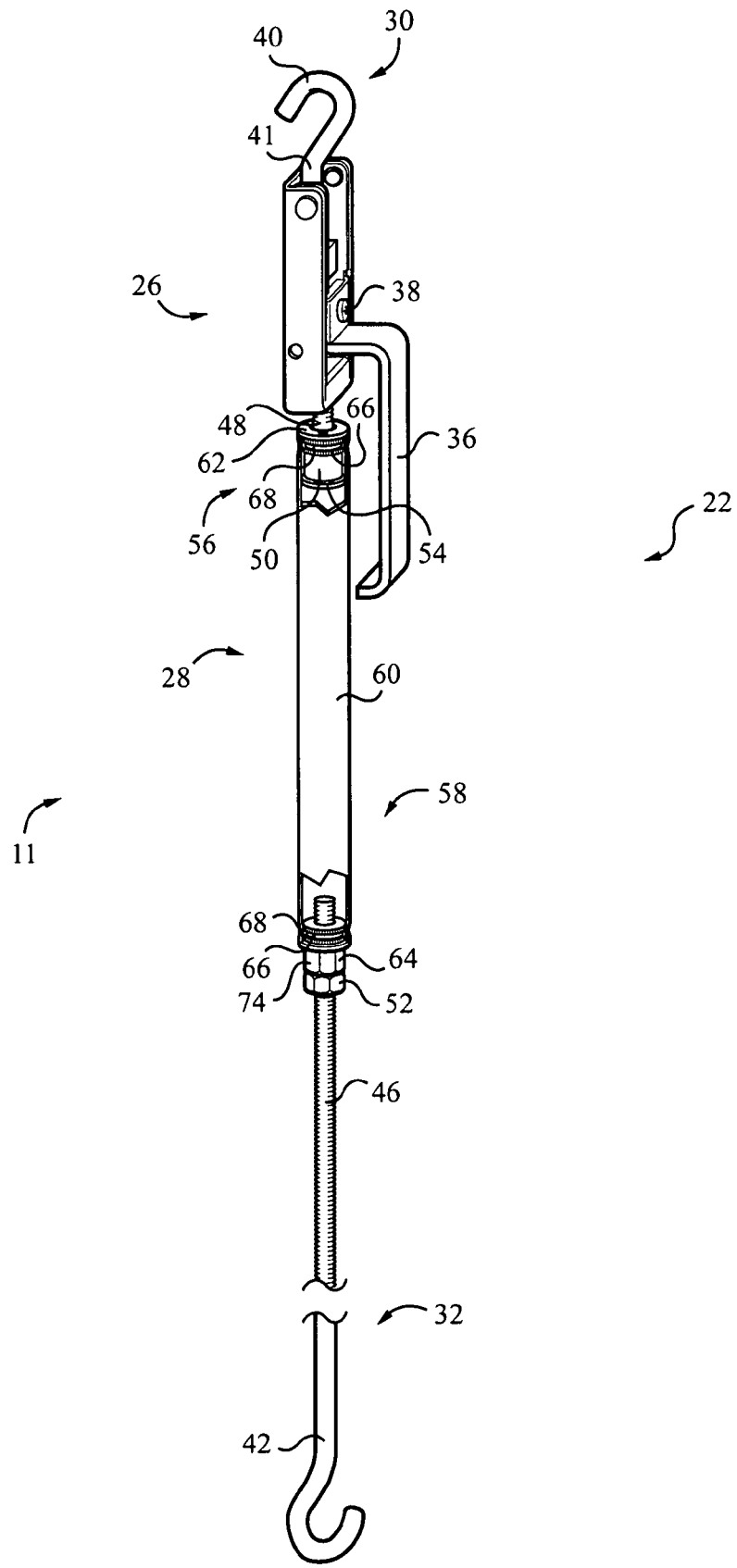
FIG. 9 shows a cut-away perspective view of one embodiment of the rear tie-down assembly from FIG. 1.

Referring to FIGS. 7–9, a number of perspective views of the rear tie-down assembly 11 are shown. In this embodiment, the rear tie-down assembly 11 is configured similarly to the front tie-down assembly 10. Therefore, the focus of the description of the rear tie-down assembly 11 is on the differences between the rear tie-down assembly 11 and the front tie-down assembly 10.

As shown in FIGS. 7–9, the linear portion 46 of second hook 42 used in the rear tie-down assembly 11 is longer than the linear portion 46 of the second hook 42 used in the front tie-down assembly 10. The extra length of the linear portion 46 in the rear tie-down assembly 11 is provided primarily to enable the rear tie-down assembly 11 to extend between the rear anchor assembly 18 coupled to the truck 14 and the anchor assembly 20 coupled to the truck camper 12. It should be appreciated that the extra length may be provided in other locations in the rear tie-down assembly 11 such as the rod 48, the turnbuckle portion 28, or the first hook 40.

Referring to FIG. 9, the cushioning member 50 used in the rear tie-down assembly 11 is a resilient polymeric material which encircles the rod 48. In one embodiment, the resilient polymeric material may be urethane, neoprene, and the like. In another embodiment, the cushioning member 50 may be a urethane spring having a durometer of 60A–90A. In yet another embodiment, the cushioning member 50 may be provided in the form of a rubber O-ring. The cushioning member 50 may be selected to provide approximately 1/16 inch to approximately 3/8 inch of movement. In one embodiment, the front tie-down assembly 10 may use a cushioning member 50 which provides approximately 1/8 inch to approximately 3/8 inch of travel and desirably approximately 1/4 inch of travel. The rear tie-down assembly 11 may use a cushioning member 50 which provides approximately 1/16 inch to approximately 1/4 inch of travel and desirable approximately 1/8 inch of travel.

Figure 10:
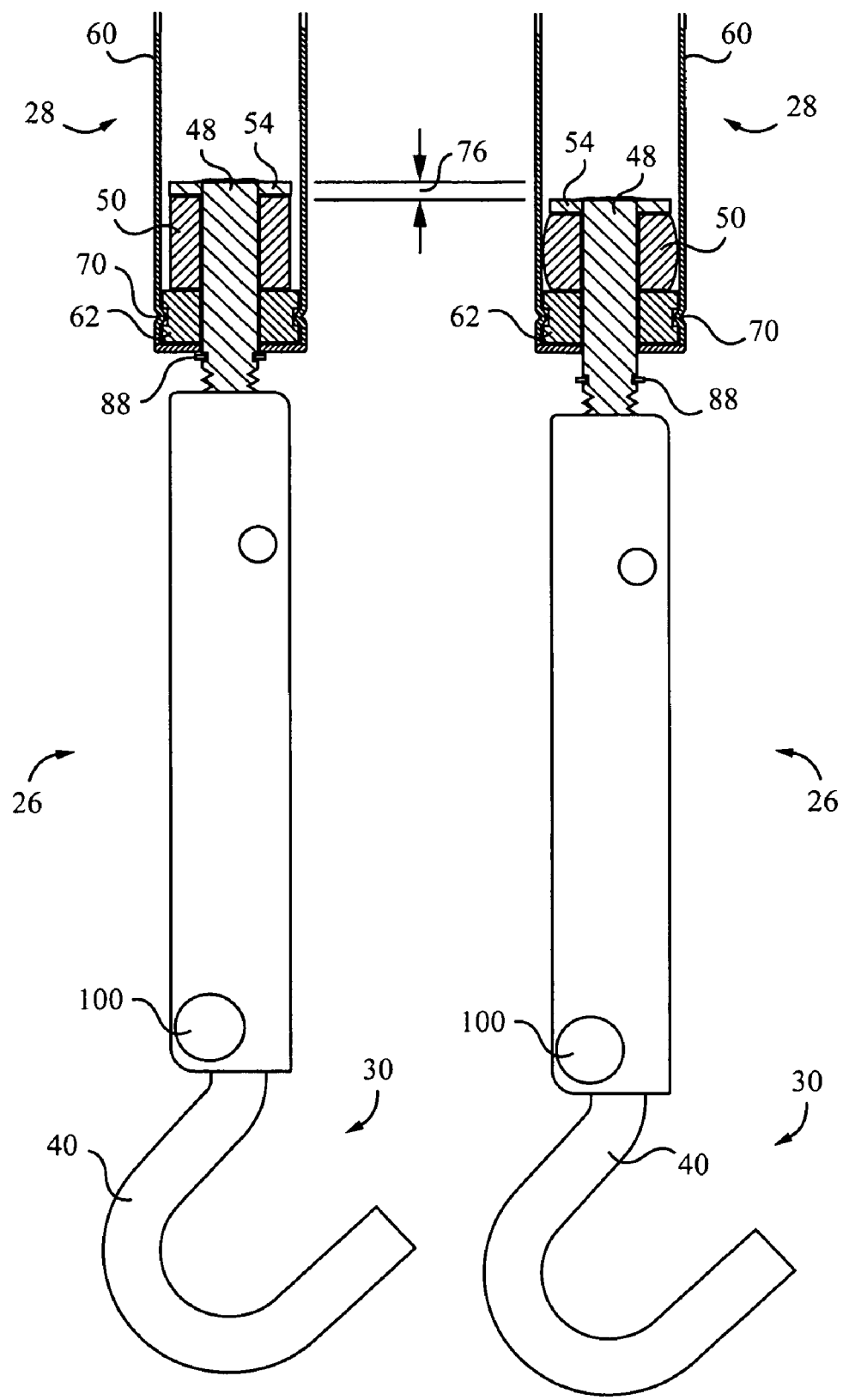
FIG. 10 shows a cut-away perspective view of two rear tie-down assemblies from FIG. 1 where a tension load is exerted on one of the tie-down assemblies.

Referring to FIG. 10, a side by side comparison is shown of the rear tie-down assembly 11 with the turnbuckle portion 28 being cut-away. The rear tie-down assembly 11 on the left is shown without a tension load being applied between the first end 30 and the second end 32. The rear tie-down assembly 11 on the right is shown with a tension load being applied between the first end 30 and the second end 32. As shown, the cushioning member 50 allows the rear tie-down assembly 11 to move lengthwise a distance of travel as indicated by reference numeral 76. It should be understood that the tension load applied to the rear tie-down assembly 11 shown on the right in FIG. 10 is the load applied when the truck camper 12 and truck 14 experience a sudden shock, not the load that is normally applied when the rear tie-down assembly 11 is in the tensioned position 22. Rather, the tie-down assemblies 10, 11 can be designed so that when the tie-down assemblies 10, 11 are in the tensioned position 22, the cushioning member 50 is not compressed, but is positioned tightly in engagement with the retaining member 54 and the upper end 56.

As shown in FIG. 10, a clip 88 may be used to engage the rod 48 to prevent the rod 48 from moving further into the turnbuckle body 60 of the turnbuckle portion 28 when a tension load is not applied to the rear tie-down assembly 11. This prevents the rear tie-down assembly 11 from feeling loose or sloppy due to the rod 48 moving in and out of the turnbuckle body 60 when the rear tie-down assembly 11 is not coupled to the truck camper 12 and the truck 14. It should be appreciated that the front tie-down assembly 10 may also be configured in this manner using the clip 88.

Figure 11:
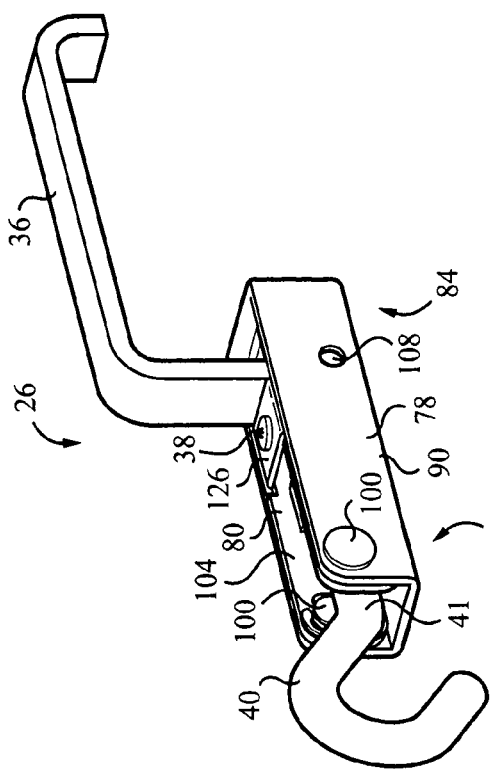
FIG. 11 shows a perspective view of one embodiment of a load binding mechanism that may be used with a tie-down assembly.
Figure 14:
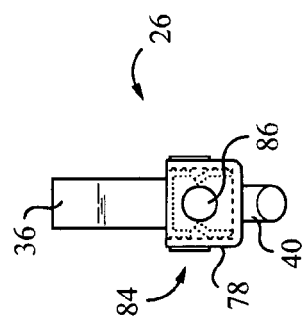
FIG. 14 shows a rear view of the load binding mechanism from FIG. 11.
Figure 13:
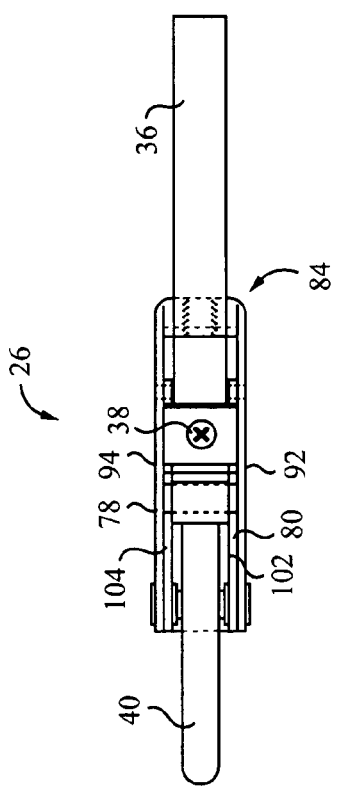
FIG. 13 shows a top view of the load binding mechanism from FIG. 11.
Figure 15:
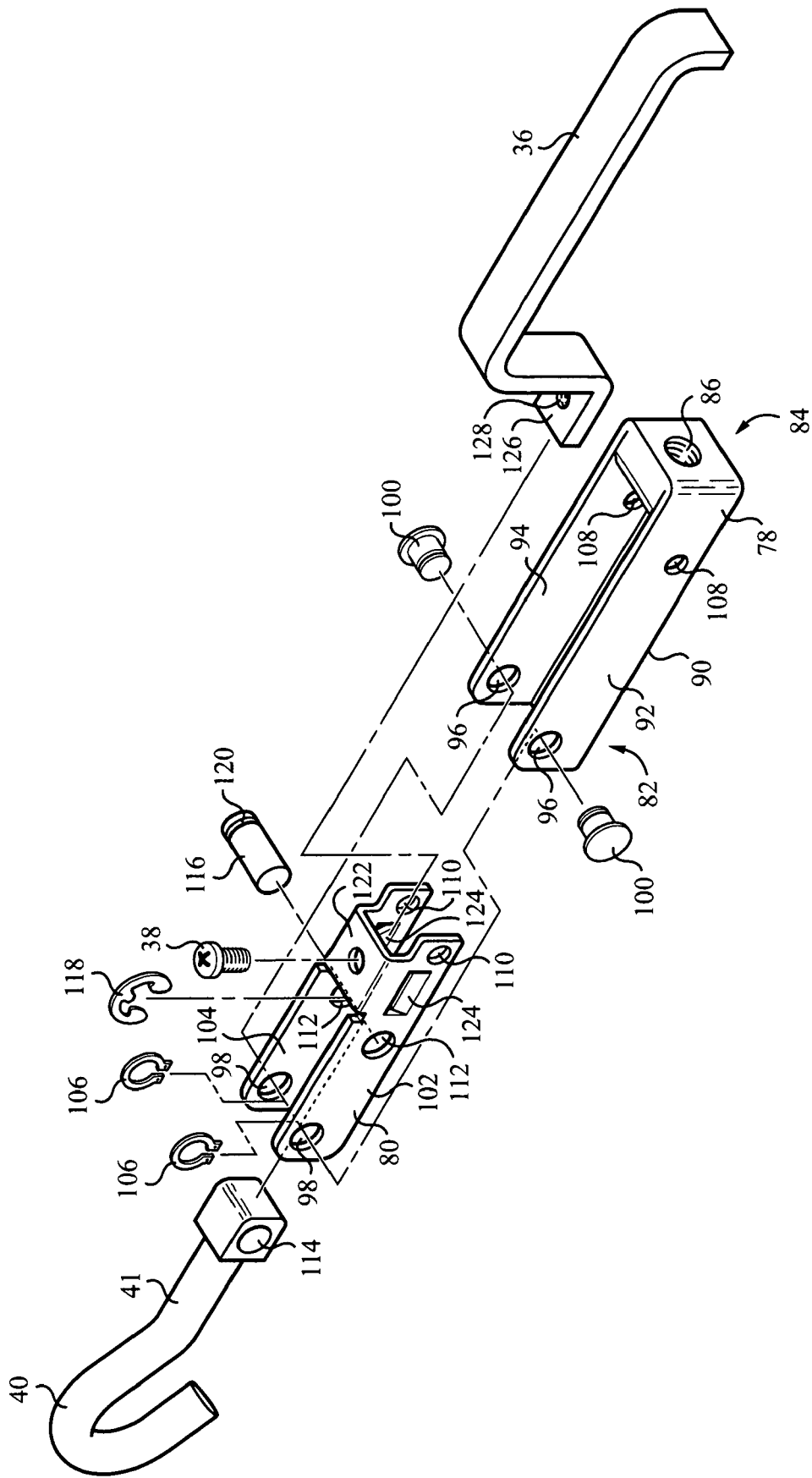
FIG. 15 shows an exploded perspective view of the load binding mechanism from FIG. 11.
Figure 16:
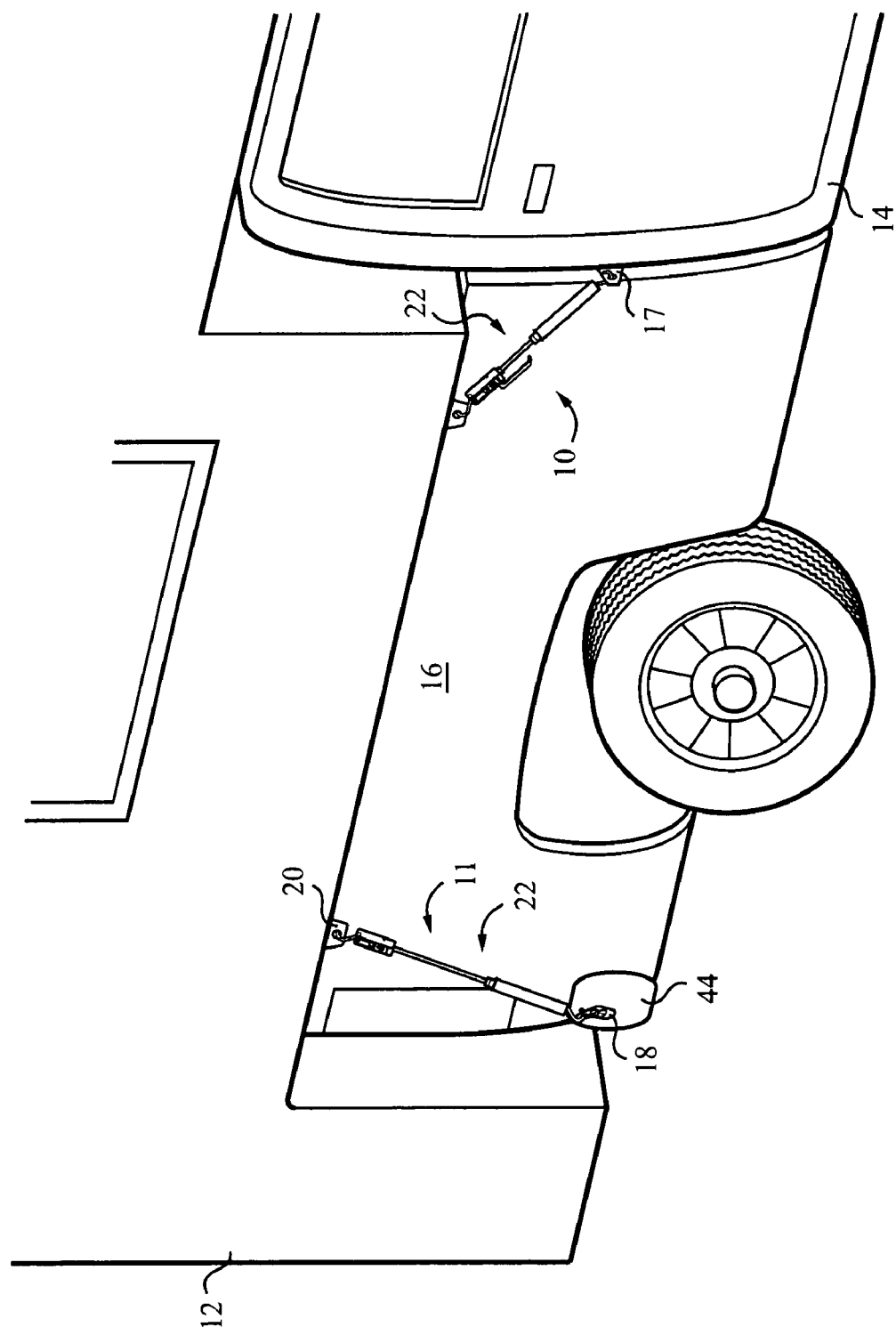
FIG. 16 shows a perspective side view of another embodiment of a tie-down assembly used to couple a truck camper to a truck.
Figure 17:
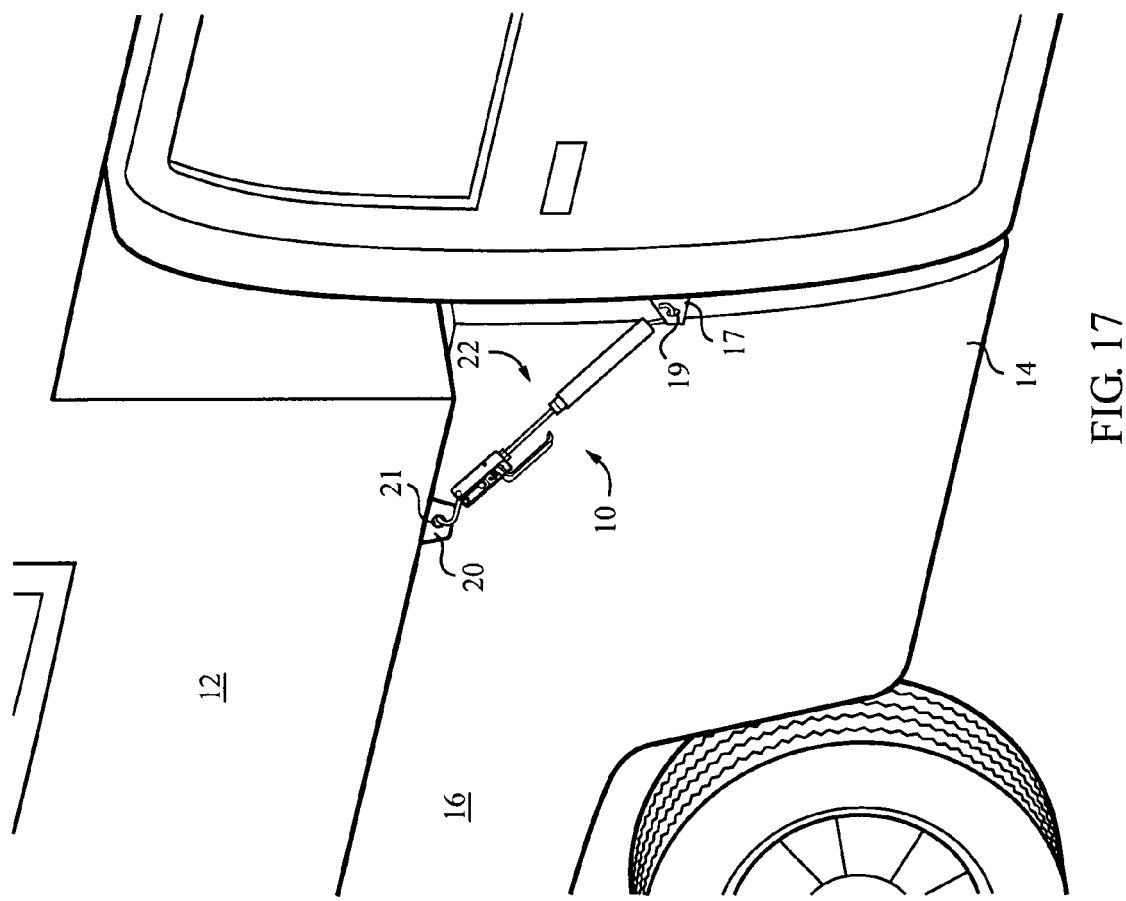
FIG. 17 shows a perspective view of the front tie-down assembly from FIG. 16 in a tensioned positioned.
Figure 18:
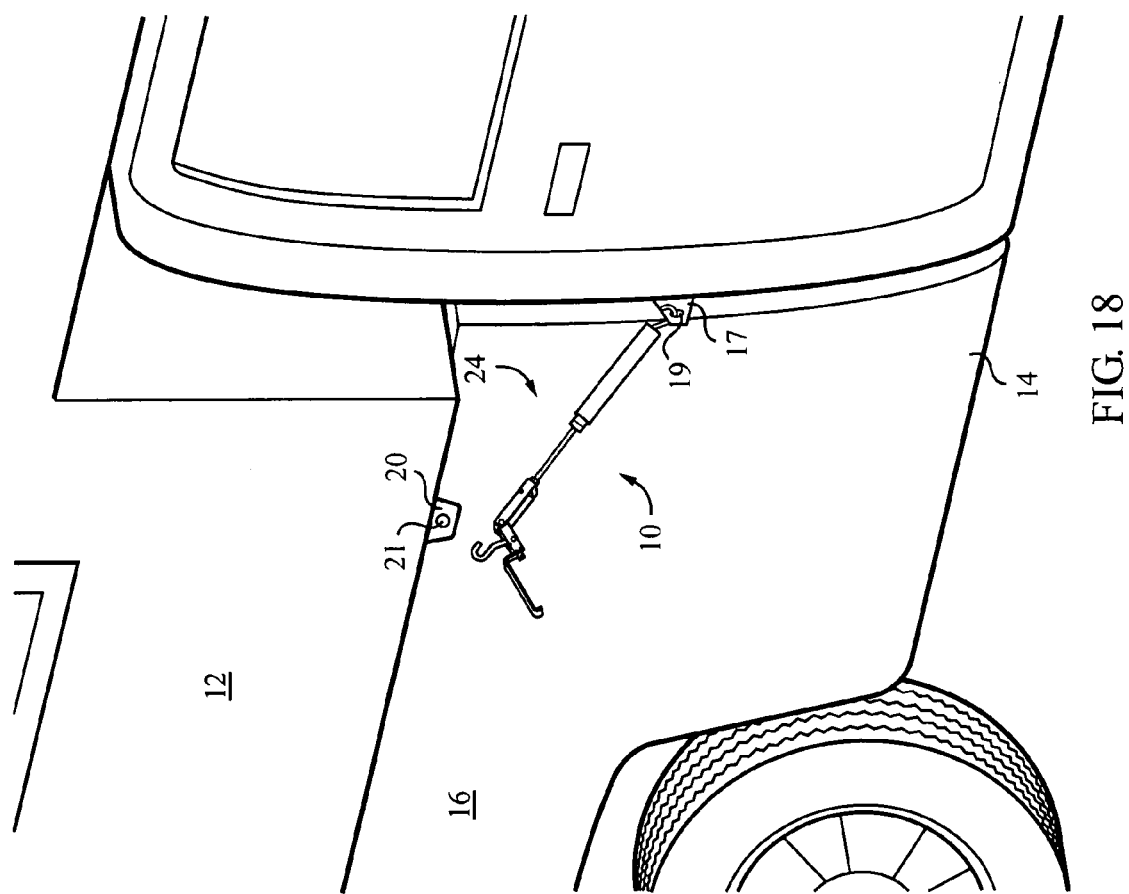
FIG. 18 shows a perspective view of the front tie-down assembly from FIG. 16 in a released position.
Figure 19:
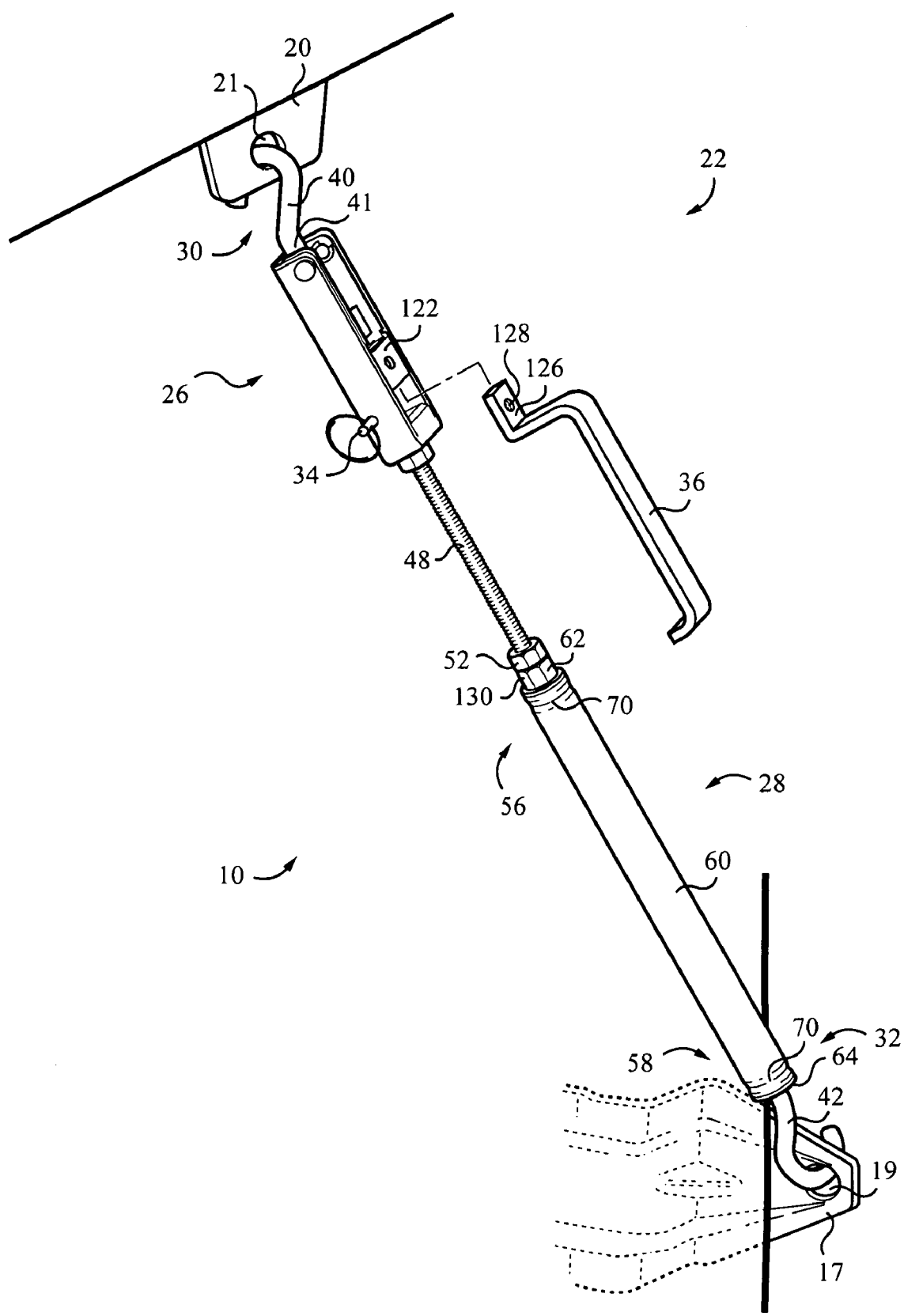
FIG. 19 shows a perspective view of the front tie-down assembly from FIG. 16 in a tensioned position and having a removable handle.
Figure 20:
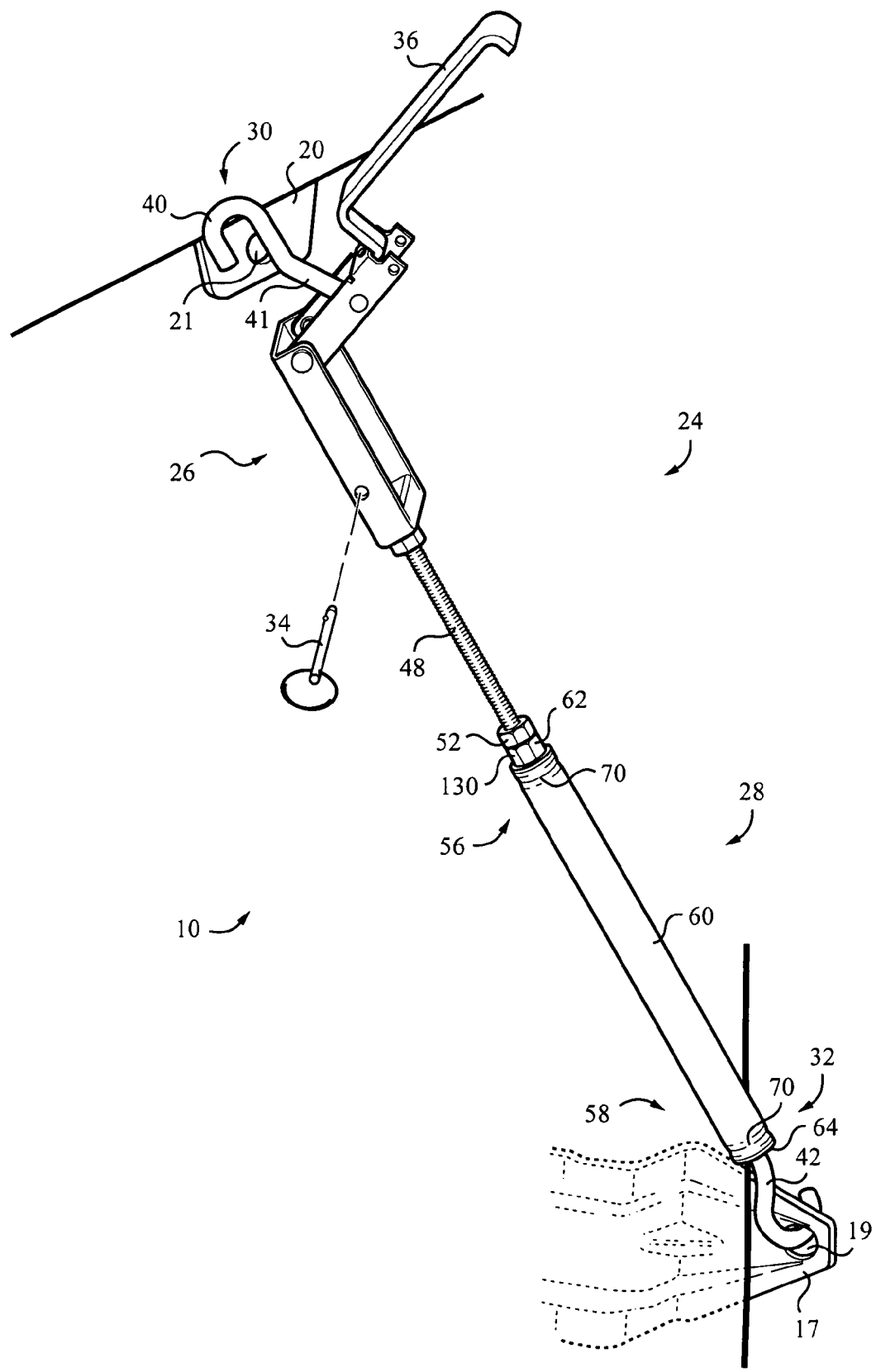
FIG. 20 shows a perspective view of the front tie-down assembly from FIG. 16 in a released position.
Figure 23:
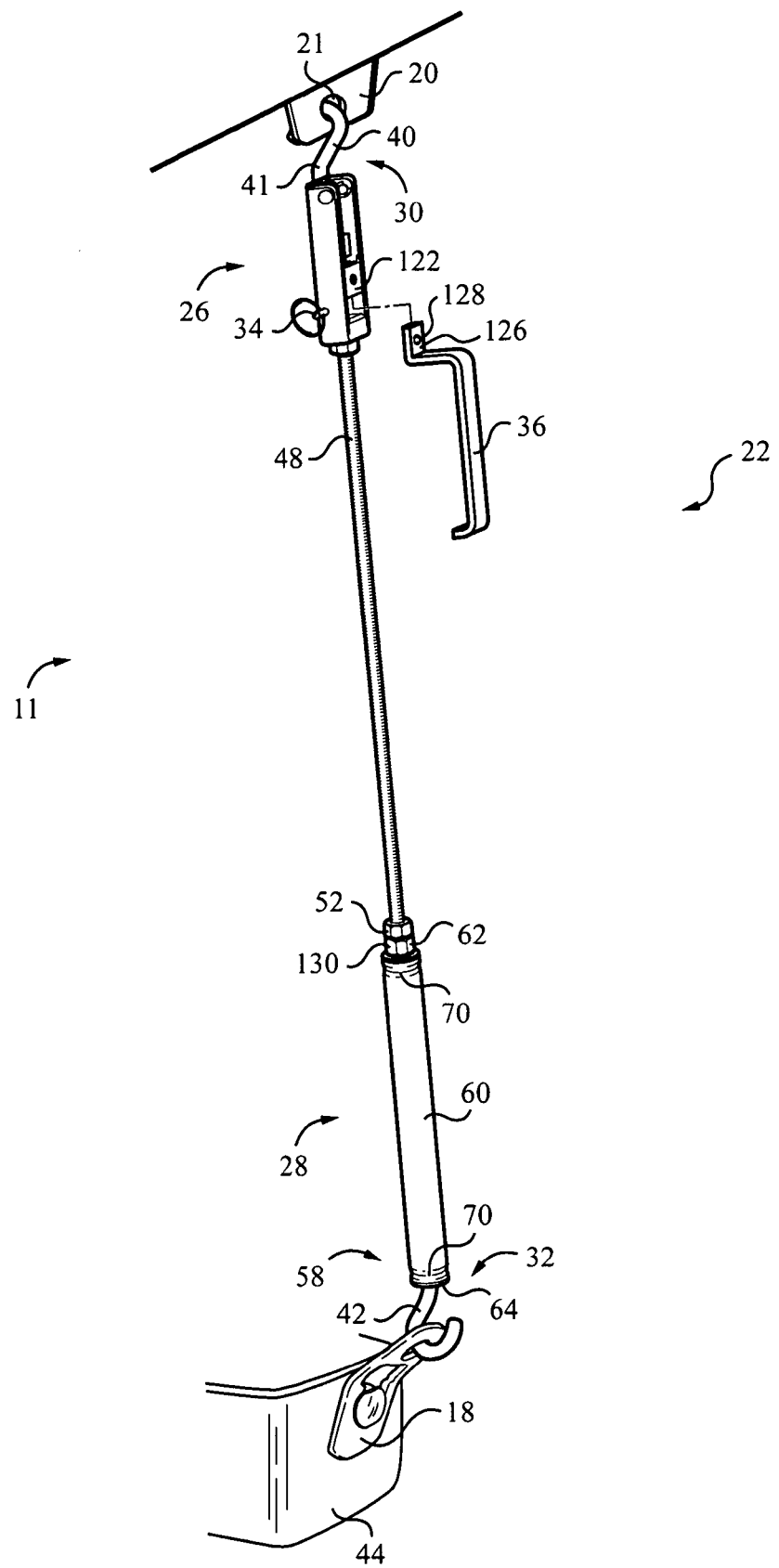
FIG. 23 shows a perspective view of the rear tie-down assembly from FIG. 16 in a tensioned position and having a removable handle.
Figure 24:
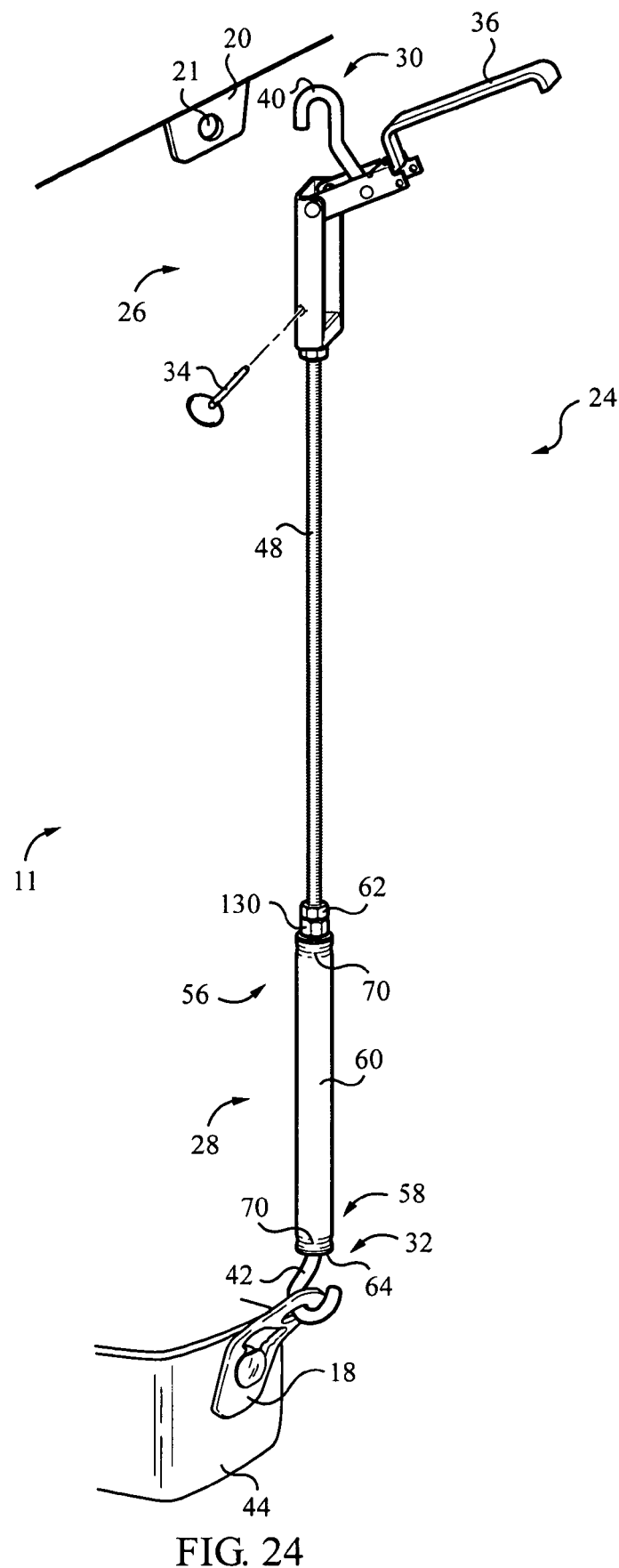
FIG. 24 shows a perspective view of the rear tie-down assembly from FIG. 16 in a released position.

Referring to FIGS. 11–15, various views of the load binding mechanism 26 are shown. In particular, FIG. 11 shows an assembled perspective view of the load binding mechanism 26 and the FIG. 15 shows an exploded perspective view of the load binding mechanism 26. The load binding mechanism 26 includes the first hook 40, the handle 36, a body or first member 78 and a clevis member or second member 80.

The body 78 includes a base 90, a first side wall 92, and a second side wall 94. The base 90, first side wall 92, and second side wall 94 form a generally U-shape. The body 78 also has a first end 82 which is open and a second end 84 which includes an opening 86 used to receive the rod 48. The opening 86 is threaded and sized to receive the threaded portion of the rod 48. A nut (not shown; see FIGS. 16–26) similar to nut 52 may be tightened until it contacts the second end 84 of the body 78 to secure the rod 48 in place. The nut may be positioned on either side of the opening 86.

The first end 82 of the body 78 includes a hole 96 in each side wall 92, 94. The holes 96 are positioned opposite each other in axially alignment. The clevis member 80 includes a first side wall 102 and a second side wall 104 each of which has a corresponding hole 98. When the clevis member 80 is positioned inside the body 78, the holes 96, 98 align to receive pins 100. A separate pin 100 is provided to pivotally couple the first side wall 92 to first side wall 102 and second side wall 94 to second side wall 104 so that a space remains between the side walls 102, 104 of the clevis member 80 that is sufficient in size to allow the linear portion 41 of the first hook 40 to be received therein when the load binding mechanism 26 is in the tensioned position 22. The space between the pins 100 can be seen in FIGS. 11 and 13. Fastening clips 106, which are received by grooves on the end of the pins 100, are used to hold the pins 100 in place.

Each of the side walls 92, 94 of the body 78 each include a hole 108 which correspond to holes 110 in the side walls 102, 104 of the clevis member 80. When the load binding mechanism 26 is in the tensioned position 22, the clevis member 80 is positioned in the body 78 so that the holes 108, 110 align to receive the securing member 34. Inserting the securing member 34 through the holes 108, 110 prevents the body 78 from moving relative to the clevis member 80, and thus prevents the load binding mechanism 26 from moving out of the tensioned position 22.

The clevis member 80 includes a hole 112 in each side wall 102, 104 and the first hook 40 includes a corresponding hole 114. When the first hook 40 is positioned in the clevis member 80, the holes 112, 114 align to receive a pin 116. The pin 116 is held in place using a fastening clip 118 which is received by a groove 120 in the pin 116. The pin 116 is configured so that when the fastening clip 118 is in place the fastening clip 118 is positioned between the first hook 40 and the second side wall 104.

Figure 12:
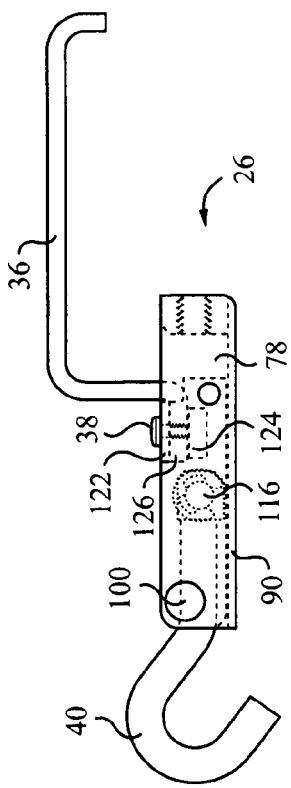
FIG. 12 shows a side view of the load binding mechanism from FIG. 11.

The clevis member 80 includes a bridge 122 which extends between the first side wall 102 and the second side wall 104. Beneath the bridge 122, a tab 124 is provided in each side wall 102, 104. The tabs 124 extend inwardly toward the center of the clevis member 80 and slope upward and outward from each respective side wall 102, 104 toward the bridge 122. An end 126 of the handle 36 includes a hole 128. The end 126 is configured to be received between the tabs 124 and the bridge 122 as shown in FIG. 12. The tabs 124 and the bridge 122 are sized to securely receive the handle 36 so that the handle 36 can be used to operate the load binding mechanism 26 without being coupled to the clevis member 80 using the fastener 38. Thus, a user can use the handle 36 to operate the load binding mechanism 26 and, when finished, easily and quickly remove the handle 36.

In operation, the handle 36 is used to pivot the clevis member 80 relative to the body 78 along the axis of the pins 100. As the clevis member 80 pivots in this fashion, the first hook 40 extends, at least partially, outward and away from the body 78, thus releasing tension that may be applied between the first hook 40 and the second hook 42 of the tie-down assemblies 10, 11.

Referring to FIGS. 16–26, another embodiment of the tie-down assemblies 10, 11 is shown. This embodiment is similar in many respects to the previous embodiment. Therefore, the focus of the description of this embodiment is on the differences between the two embodiments. In the embodiment shown in FIGS. 16–26, the linear portion 46 of the second hook 42 is shorter and not threaded. The second hook 42 is also configured to rotate freely relative to the turnbuckle portion 28. The rod 48 is threadably received by both the load binding mechanism 26 and the turnbuckle portion 28. The length of the tie-down assemblies 10, 11 may be adjusted while the first end 30 and the second end 32 of the tie-down assemblies 10, 11 are coupled to the anchor assemblies 20, 17, respectively, by rotating the turnbuckle portion 28 relative to the rod 48. Once the desired position has been reached, the nut 52 can be tightened until the nut 52 engages the upper end plug 62. The upper end plug 62 includes a hexagonal portion 130 which is capable of receiving a wrench to hold the turnbuckle portion 28 in place while tightening the nut 52.

As shown in FIGS. 21–22 and 25–26, the cushioning member 50 may be positioned between a retaining member 132 coupled to the end of the linear portion 46 of the second hook 42 and the lower end plug 64 positioned in the turnbuckle body 60. When the tie-down assemblies 10, 11 experience a shock or sudden increase in the tension load the cushioning member 50 is compressed to at least partially absorb the shock.

ILLUSTRATIVE EMBODIMENTS

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments. Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

According to one embodiment, a tie-down assembly comprises: a lever-type load binding mechanism; a first end and a second end which are used to couple the load binding mechanism between one or more objects, the load binding mechanism being positioned between the first end and the second end so that when the first end and the second end are coupled between the one or more objects, the load binding mechanism is movable between a tensioned position where a tension load is applied between the first end and the second end and a released position; and a cushioning member used to cushion the tension load; wherein a distance between the first end and the second end is adjustable independent of the load binding mechanism and without rotating the first end or the second end. The cushioning member may be coupled to the first end so that the cushioning member is used to couple the first end to the one or more objects. The distance between the first end and the second end may be adjustable by rotating a portion of the tie-down assembly. The distance between the first end and the second end may be adjustable without rotating the load binding mechanism around a longitudinal axis of the tie-down assembly. The tie-down assembly may be configured to be locked in the tensioned position using a lock. The first end may include a first hook and the second end may include a second hook, the first hook and the second hook may be used to couple the load binding mechanism between the one or more objects. The first hook and the second hook may be rigidly coupled to the load binding mechanism. The tie-down assembly may comprise a handle which is used to operate the load binding mechanism, wherein the handle is removable from the tie-down assembly when the load binding mechanism is in the tensioned position. The cushioning member may include a spring. A truck including a truck camper supported by a bed of the truck may use the tie-down assembly to couple the truck to the truck camper.

According to another embodiment, a tie-down assembly may comprise: a lever-type load binding mechanism including a handle which is used to operate the load binding mechanism; a first end and a second end which are used to couple the load binding mechanism between one or more objects, the load binding mechanism being positioned between the first end and the second end so that when the first end and the second end are coupled between the one or more objects, the load binding mechanism is movable between a tensioned position where a tension load is applied between the first end and the second end and a released position; and a cushioning member positioned between the first end and the second end, the cushioning member being used to cushion the tension load; wherein the handle is removable from the tie-down assembly when the load binding mechanism is in the tensioned position. A distance between the first end and the second end may be adjustable independent of the load binding mechanism. The distance between the first end and the second end may be adjustable without rotating the first end or the second end. The tie-down assembly may be configured to be locked in the tensioned position using a lock. The first end may include a first hook and the second end may include a second hook, the first hook and the second hook being used to couple the load binding mechanism between the one or more objects. The first hook and the second hook may be rigidly coupled to the load binding mechanism. A truck including a truck camper supported by a bed of the truck may use the tie-down assembly to couple the truck to the truck camper.

According to another embodiment, a tie-down assembly may comprise: a lever-type load binding mechanism including a handle which is used to operate the load binding mechanism; and a first end and a second end which are used to couple the load binding mechanism between one or more objects, the load binding mechanism being positioned between the first end and the second end so that when the first end and the second end are coupled between the one or more objects, the load binding mechanism is movable between a tensioned position where a tension load is applied between the first end and the second end and a released position; wherein a distance between the first end and the second end is adjustable independent of the load binding mechanism and without rotating the first end or the second end; and wherein the handle is removable from the tie-down assembly when the load binding mechanism is in the tensioned position. The tie-down assembly may be configured to be locked in the tensioned position using a lock. The first end may include a first hook and the second end may include a second hook, the first hook and the second hook being used to couple the load binding mechanism between the one or more objects. The first hook and the second hook may be rigidly coupled to the load binding mechanism. A truck including a truck camper supported by a bed of the truck may use the tie-down assembly to couple the truck to the truck camper.

According to another embodiment, a truck comprises: a truck camper supported by a bed of the truck; and a tie-down assembly used to couple the truck camper to the truck, the tie-down assembly including a quick-release mechanism; wherein the length of the tie-down assembly is adjustable independent of quick-release mechanism when the tie-down assembly is coupled to the truck camper and the truck. The length of the tie-down assembly may be adjusted by rotating a portion of the tie-down assembly. The length of the tie-down assembly may be adjustable without rotating the quick-release mechanism. The quick-release mechanism may be a load binding mechanism. The quick-release mechanism may be a lever-type load binding mechanism. The tie-down assembly may include a cushioning member used to cushion a tension load on the tie-down assembly. The cushioning member may include a spring. The cushioning member may include a resilient member. The quick-release mechanism may move between a tensioned position where a tension load is applied between the truck and the truck camper and a released position. The tie-down assembly can be locked in the tensioned position using a lock. The tie-down assembly may include a first hook used to couple the tie-down assembly to the truck camper and a second hook used to couple the tie-down assembly to the truck. The first hook and the second hook may be rigidly coupled to the load binding mechanism. The tie-down assembly may comprise a handle which is used to operate quick-release mechanism, wherein the handle is configured to be removed from the tie-down assembly. The tie-down assembly may be used to couple the truck camper to the bed of the truck. The tie-down assembly may be used to couple the truck camper to a bumper of the truck. The tie-down assembly may be used to couple the truck camper to a frame rail of the truck.

According to another embodiment, a truck comprises: a truck camper supported by a bed of the truck; and a tie-down assembly used to couple the truck camper to the truck, the tie-down assembly including a quick-release mechanism, the quick-release mechanism including a handle which is used to operate the quick-release mechanism; wherein the handle is configured to be removed from the tie-down assembly when the handle is not being used to operate the quick-release mechanism. The length of the tie-down assembly may be adjustable independent of quick-release mechanism when the tie-down assembly is coupled to the truck camper and the truck. The length of the tie-down assembly may be adjusted by rotating a portion of the tie-down assembly. The length of the tie-down assembly may be adjustable without rotating the quick-release mechanism. The quick-release mechanism may be a load binding mechanism. The quick-release mechanism may be a lever-type load binding mechanism. The tie-down assembly may include a cushioning member used to cushion a tension load on the tie-down assembly. The cushioning member includes a spring. The cushioning member may include a resilient member. The quick-release mechanism may move between a tensioned position where a tension load is applied between the truck and the truck camper and a released position. The tie-down assembly can be locked in the tensioned position using a lock. The tie-down assembly may include a first hook used to couple the tie-down assembly to the truck camper and a second hook used to couple the tie-down assembly to the truck. The first hook and the second hook may be rigidly coupled to the load binding mechanism. The tie-down assembly may be used to couple the truck camper to the bed of the truck. The tie-down assembly may be used to couple the truck camper to a bumper of the truck. The tie-down assembly may be used to couple the truck camper to a frame rail of the truck.

According to another embodiment, a tie-down assembly comprises: a first end which includes a hook used to couple the tie-down assembly to an object; a lever-type load binding mechanism; and a second end which includes a threaded rod configured to be received by a corresponding tubular member having a threaded opening.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., common use and/or technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the claims are not tied and should not be interpreted to be tied to any particular embodiment, feature, or combination of features other than those explicitly recited in the claims, even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing Figures. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A truck comprising:
   a bed;
   a truck camper supported by the bed; and
   a tie-down assembly coupled between the truck and the truck camper, the tie-down assembly including
      a lever-type load binding mechanism;
      a first end and a second end, the load binding mechanism being positioned between the first end and the second end so that when the first end and the second end are coupled between the truck and the truck camper the load binding mechanism is movable between a tensioned position where a tension load is exerted on the tie assembly and a released position; and
      a cushioning member used to cushion the tension load;
   wherein a distance between the first end and the second end is adjustable independent of the load binding mechanism, without tensioning the tie-down assembly, and when the first end and the second end are coupled between the truck and the truck camper.

2. The truck of claim 1 wherein the cushioning member is positioned between the first end of the tie-down assembly and the second end of the tie-down assembly.

3. The truck of claim 1 wherein the distance between the first end and the second end is adjustable by rotating a portion of the tie-down assembly.

4. The truck of claim 1 wherein the distance between the first end and the second end is adjustable without rotating the load binding mechanism around a longitudinal axis of the tie-down assembly.

5. The truck of claim 1 wherein the tie-down assembly is configured to be locked in the tensioned position.

6. The truck of claim 1 wherein the first end includes a first hook and the second end includes a second hook, the first hook and the second hook being used to couple the load binding mechanism between the truck and the truck camper.

7. The truck of claim 6 wherein the first hook extends rigidly from the load binding mechanism.

8. The truck of claim 1 wherein the tie-down assembly includes a removable handle which is used to operate the load binding mechanism.

9. The truck of claim 1 wherein the cushioning member includes a spring.

10. The truck of claim 1 wherein the cushioning member includes a resilient polymeric material.

11. A tie-down assembly comprising: a lever-type load binding mechanism including a handle which is used to operate the load binding mechanism;
   a first end and a second end which are used to couple the load binding mechanism between one or more objects, the load binding mechanism being positioned between the first end and the second end so that when the first end and the second end are coupled between the one or more objects the load binding mechanism is movable between a tensioned position where a tension load is exerted on the tie-down assembly and a released position; and
   a cushioning member positioned between the first end and the second end, the cushioning member being used to cushion the tension load;
   wherein the handle is removable from the tie-down assembly when the load binding mechanism is in the tensioned position.

12. The tie-down assembly of claim 11 wherein a distance between the first end and the second end is adjustable independent of the load binding mechanism and without tensioning the tie-down assembly.

13. The tie-down assembly of claim 12 wherein the distance between the first end and the second end is adjustable without rotating the first end or the second end.

14. The tie-down assembly of claim 11 wherein the tie-down assembly is configured to be locked in the tensioned position.

15. The tie-down assembly of claim 11 wherein the first end includes a first hook and the second end includes a second hook, the first hook and the second hook being used to couple the load binding mechanism between the one or more objects.

16. The tie-down assembly of claim 15 wherein the first hook extends rigidly from the load binding mechanism.

17. A truck including a truck camper supported by a bed of the truck, wherein the tie-down assembly of claim 11 is coupled between the truck and the truck camper.

18. A tie-down assembly comprising:
a lever-type load binding mechanism including a handle which is used to operate the load binding mechanism; and
a first end and a second end which are used to couple the load binding mechanism between one or more objects, the load binding mechanism being positioned between the first end and the second end so that when the first end and the second end are coupled between the one or more objects the load binding mechanism is movable between a tensioned position where a tension load is exerted on the tie-down assembly and a released position;
wherein a distance between the first end and the second end is adjustable independent of the load binding mechanism, without rotating the first end or the second end and without tensioning the tie-down assembly; and
wherein the handle is removable from the tie-down assembly when the load binding mechanism is in the tensioned position.

19. The tie-down assembly of claim 18 wherein the tie-down assembly is configured to be locked in the tensioned position.

20. The tie-down assembly of claim 18 wherein the first end includes a first hook and the second end includes a second hook, the first hook and the second hook being used to couple the load binding mechanism between the one or more objects.

21. The tie-down assembly of claim 20 wherein the first hook extends rigidly from the load binding mechanism.

22. A truck including a truck camper supported by a bed of the truck, wherein the tie-down assembly of claim 18 is coupled between the truck and the truck camper.

23. A tie-down assembly comprising:
a lever-type load binding mechanism including a removable handle which is used to operate the load binding mechanism, the load binding mechanism being movable between a tensioned position and a released position;
a hook coupled to the load binding mechanism; and
a threaded rod coupled to the load binding mechanism opposite the hook.

24. The tie-down assembly of claim 23 wherein the hook extends rigidly from the load binding mechanism.

25. The tie-down assembly of claim 23 including a cushioning member used to cushion a tension load exerted on the tie-down assembly when the load binding mechanism is in the tensioned position.

26. The tie-down assembly of claim 23 wherein the load binding mechanism includes a hole which receives a securing member to hold the load binding mechanism in the tensioned position and prevent the load binding mechanism from moving to the released position.

27. A truck including a truck camper supported by a bed of the truck, wherein the tie-down assembly of claim 23 is coupled between the truck and the truck camper.

28. A truck comprising:
a bed;
a truck camper supported by the bed; and
a tie-down assembly coupled between the truck and the truck camper, the tie-down assembly including
a lever-type load binding mechanism which is movable between a tensioned position where a tension load is exerted on the tie-down assembly and a released position;
a first hook coupled to the load binding mechanism;
a rod coupled to the load binding mechanism opposite the first hook;
a tubular body coupled to the rod opposite the load binding mechanism; and a second hook coupled to the tubular body opposite the rod.

29. The truck of claim 28 wherein the rod is straight along its entire length.

30. The truck of claim 28 wherein the tie-down assembly includes a removable handle which is used to operate the load binding mechanism.

31. The truck of claim 28 wherein the tie-down assembly includes a hole configured to receive a securing member to hold the load binding mechanism in the tensioned position and prevent the load binding mechanism from moving to the released position.

32. The truck of claim 28 wherein the tie-down assembly includes a cushioning member used to cushion the tension load exerted on the tie-down assembly when the load binding mechanism is in the tensioned position.

33. The truck of claim 32 wherein the cushioning member includes a resilient polymeric material.

34. A truck comprising:
a bed;
a truck camper supported by the bed; and
a tie-down assembly coupled between the truck and the truck camper, the tie-down assembly including
a lever-type load binding mechanism which is movable between a tensioned position where a tension load is exerted on the tie-down assembly and a released position;
a first hook coupled to the load binding mechanism;
a rod coupled to the load binding mechanism opposite the first hook;
a cylindrical body coupled to the rod opposite the load binding mechanism;
a second hook coupled to the cylindrical body opposite the rod; and
a cushioning member coupled between the cylindrical body and the
second hook, the cushioning member being compressed as the tension load is exerted on the tie-down assembly.

35. The truck of claim 34 wherein the first hook extends rigidly from the load binding mechanism and the second hook extends rigidly from the cylindrical body.

36. The truck of claim 34 wherein the tie-down assembly includes a removable handle which is used to operate the load binding mechanism.

37. The truck of claim 34 wherein the tie-down assembly includes a hole configured to receive a securing member to hold the load binding mechanism in the tensioned position and prevent the load binding mechanism from moving to the released position.

38. The truck of claim 34 wherein the cushioning member includes a spring.

39. The truck of claim 34 wherein the cushioning member includes a resilient polymeric material.

40. The truck of claim 34 wherein a distance between the first hook and the second hook is adjustable independent of the load binding mechanism, without tensioning the tie-down assembly, and when the tie-down assembly is coupled between the truck and the truck camper.

41. The truck of claim 34 wherein the entire length of the rod is threaded.

42. A truck comprising:
a bed;
a truck camper supported by the bed; and
a tie-down assembly coupled between the truck and the truck camper, the tie-down assembly including a lever-type load binding mechanism which is movable between a tensioned position where a tension load is exerted on the tie-down assembly and a released position;
wherein the length of the tie-down assembly is adjustable independent of the load binding mechanism, without tensioning the tie-down assembly, and when the tie-down assembly is coupled between the truck and the truck camper.

43. The truck of claim 42 wherein the length of the tie-down assembly is adjustable by rotating a portion of the tie-down assembly.

44. The truck of claim 42 wherein the length of the tie-down assembly is adjustable without rotating the load binding mechanism around a longitudinal axis of the tie-down assembly.

45. The truck of claim 42 wherein the tie-down assembly is configured to be locked in the tensioned position.

46. The truck of claim 42 wherein the tie-down assembly includes a removable handle which is used to operate the load binding mechanism.

47. The truck of claim 42 wherein the tie-down assembly includes a cushioning member used to cushion the tension load exerted on the tie-down assembly.

48. The truck of claim 47 wherein the cushioning member includes a spring.

49. The truck of claim 47 wherein the cushioning member includes a resilient polymeric material.

50. The truck of claim 42 wherein the tie-down assembly includes a rod coupled to the load binding mechanism; and a tubular body coupled to the rod opposite the load binding mechanism.

51. A truck comprising:
a bed;
a truck camper supported by the bed; and
a tie-down assembly coupled between the truck and the truck camper, the tie-down assembly including
a lever-type load binding mechanism which is movable between a tensioned position where a tension load is exerted on the tie-down assembly and a released position;
a rod coupled to the load binding mechanism;
a tubular body coupled to the rod opposite the load binding mechanism.

52. The truck of claim 51 wherein the tie-down assembly includes a removable handle which is used to operate the load binding mechanism.

53. The truck of claim 51 wherein the tubular body includes a threaded opening which receives a threaded portion of the rod.

54. The truck of claim 51 wherein the tubular body is rotatable relative to the rod when the tie-down assembly is not coupled between the truck and the truck camper and wherein rotation of the tubular body relative to the rod does not adjust the length of the tie-down assembly.

55. The truck of claim 51 wherein the tie-down assembly includes a hook coupled to the tubular body opposite the rod.

56. The truck of claim 55 wherein the tubular body includes a threaded opening which receives a threaded portion of the hook.

57. The truck of claim 55 wherein the hook is rotatable relative to the tubular body when the tie-down assembly is not coupled between the truck and the truck camper and wherein rotation of the hook and the tubular body does not adjust the length of the tie-down assembly.

58. The truck of claim 51 wherein the length of the tie-down assembly is adjustable independent of the load binding mechanism, without tensioning the tie-down assembly, and when the tie-down assembly is coupled between the truck and the truck camper.

59. The truck of claim 51 wherein the tie-down assembly includes a cushioning member used to cushion the tension load exerted on the tie down assembly.

60. The truck of claim 59 wherein the cushioning member includes a spring.

61. The truck of claim 59 wherein the cushioning member includes a resilient polymeric material.

62. A truck comprising:
a bed;
a truck camper supported by the bed; and
a tie-down assembly coupled between the truck and the truck camper, the tie-down assembly including
a lever-type load binding mechanism;
a first end and a second end, the load binding mechanism being positioned between the first end and the second end so that when the first end and the second end are coupled between the truck and the truck camper the load binding mechanism is movable between a tensioned position where a tension load exerted on the tie assembly and a released position; and
a cushioning member used to cushion the tension load and including a resilient polymeric material;
wherein a distance between the first end and the second end is adjustable independent of the load binding mechanism, without tensioning the tie-down assembly, and when the first end and the second end are coupled between the truck and the truck camper.

63. The truck of claim 62 wherein the cushioning member is positioned between the first end of the tie-down assembly and the second end of the tie-down assembly.

64. The truck of claim 62 wherein the distance between the first end and the second end is adjustable by rotating a portion of the tie-down assembly.

65. The truck of claim 62 wherein the distance between the first end and the second end is adjustable without rotating the load binding mechanism around a longitudinal axis of the tie-down assembly.

66. The truck of claim 62 wherein the tie-down assembly is configured to be locked in the tensioned position.

67. The truck of claim 62 wherein the first end includes a first hook and the second end includes a second hook, the first book and the second hook being used to couple the load binding mechanism between the truck and the truck camper.

68. The truck of claim 67 wherein the first hook extends rigidly from the load binding mechanism.

69. A truck comprising:
a bed;
a truck camper supported by the bed; and a tie-down assembly coupled between the truck and the truck camper, the tie-down assembly including
  a lever-type load binding mechanism which is movable between a tensioned position where a tension load is exerted on the tie-down assembly and a released position;
  a first hook coupled to the load binding mechanism;
  a rod coupled to the load binding mechanism opposite the first hook;
  a tubular body coupled to the rod opposite the load binding mechanism;
  a second hook coupled to the tubular body opposite the rod; and
  a cushioning member used to cushion the tension load exerted on the tie-down assembly when the load binding mechanism is in the tensioned position, the cushioning member including a resilient polymeric material.

70. The truck of claim 69 wherein the rod is straight along its entire length.

71. The truck of claim 69 wherein the tie-down assembly includes a hole configured to receive a securing member to hold the load binding mechanism in the tensioned position and prevent the load binding mechanism from moving to the released position.

72. A truck comprising:
a bed;
a truck camper supported by the bed; and
a tie-down assembly coupled between the truck and the truck camper, the tie-down assembly including a lever-type load binding mechanism which is movable between a tensioned position where a tension load is exerted on the tie-down assembly and a released position and further including a cushioning member used to cushion the tension load exerted on the tie-down assembly, the cushioning member including a resilient polymeric material;
  wherein the length of the tie-down assembly is adjustable independent of the load binding mechanism, without tensioning the tie-down assembly, and when the tie-down assembly is coupled between the truck and the truck camper.

73. The truck of claim 72 wherein the length of the tie-down assembly is adjustable by rotating a portion of the tie-down assembly.

74. The truck of claim 72 wherein the length of the tie-down assembly is adjustable without rotating the load binding mechanism around a longitudinal axis of the tie-down assembly.

75. The truck of claim 72 wherein the tie-down assembly is configured to be locked in the tensioned position.

* * * * *